United States Patent
Nakano et al.

(10) Patent No.: US 10,439,455 B2
(45) Date of Patent: Oct. 8, 2019

(54) METHOD FOR MANUFACTURING STRATOR, METHOD FOR MANUFACTURING ROTARY ELECTRIC MACHINE, AND IRON-CORE BLOCK

(71) Applicant: MITSUBISHI ELECTRIC CORPORATION, Chiyoda-ku, Tokyo (JP)

(72) Inventors: Aiko Nakano, Tokyo (JP); Atsushi Sakaue, Tokyo (JP); Tatsuro Hino, Tokyo (JP); Kazunori Muto, Tokyo (JP); Yoshihiro Harada, Tokyo (JP); Shinkichi Sawa, Tokyo (JP); Masashi Nakamura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 255 days.

(21) Appl. No.: 15/512,927

(22) PCT Filed: Dec. 9, 2015

(86) PCT No.: PCT/JP2015/084497
§ 371 (c)(1),
(2) Date: Mar. 21, 2017

(87) PCT Pub. No.: WO2016/093267
PCT Pub. Date: Jun. 16, 2016

(65) Prior Publication Data
US 2017/0294812 A1    Oct. 12, 2017

(30) Foreign Application Priority Data

Dec. 9, 2014 (JP) .................................. 2014-248513

(51) Int. Cl.
*H02K 1/16* (2006.01)
*H02K 15/02* (2006.01)
(Continued)

(52) U.S. Cl.
CPC ............. *H02K 1/165* (2013.01); *H02K 1/148* (2013.01); *H02K 1/16* (2013.01); *H02K 1/265* (2013.01);
(Continued)

(58) Field of Classification Search
CPC .......... H02K 1/26; H02K 15/02; H02K 15/10; H02K 1/16; H02K 1/165; H02K 1/265;
(Continued)

(56) References Cited

U.S. PATENT DOCUMENTS 911,713 A * 2/1909 Frankenfield .......... H02K 15/12
                                                            310/214
9,209,659 B2 * 12/2015 Mori ....................... H02K 3/522
(Continued)

FOREIGN PATENT DOCUMENTS

GB    1 586 509 A    3/1981
JP    36-4029 Y1     2/1961
(Continued)

OTHER PUBLICATIONS

Office Action (Notification of Reasons for Refusal) dated Aug. 29, 2017, by the Japanese Patent Office in Japanese Patent Application No. 2016-563708, and an English Translation of the Office Action. (6 pages).

(Continued)

*Primary Examiner* — Naishadh N Desai
(74) *Attorney, Agent, or Firm* — Buchanan Ingersoll & Rooney PC

(57) ABSTRACT

A tooth groove is provided at a border portion between a tooth body portion and a protrusion. The angle between a (Continued)

tooth body portion lateral face which is a lateral face in the circumferential direction of the tooth body portion and a tooth body portion stop portion which is a face, of the tooth groove, continued from the tooth body portion lateral face is the right angle or an acute angle. The protrusion is rotated toward the outer side in the circumferential direction, to bring a protrusion stop portion into close contact with the tooth body portion stop portion, the protrusion stop portion being an outer-circumferential-side lateral face of the protrusion, thereby forming a shoe in a tooth.

13 Claims, 24 Drawing Sheets

(51) Int. Cl.
*H02K 1/14* (2006.01)
*H02K 3/493* (2006.01)
*H02K 15/06* (2006.01)
*H02K 1/26* (2006.01)
*H02K 15/10* (2006.01)

(52) U.S. Cl.
CPC ........... *H02K 3/493* (2013.01); *H02K 15/022* (2013.01); *H02K 15/024* (2013.01); *H02K 15/026* (2013.01); *H02K 15/066* (2013.01); *H02K 15/10* (2013.01); *H02K 2213/03* (2013.01)

(58) Field of Classification Search
CPC .... H02K 15/026; H02K 3/493; H02K 15/022; H02K 15/024; H02K 15/066; H02K 1/148
See application file for complete search history.

(56) References Cited

U.S. PATENT DOCUMENTS

| | | | |
|---|---|---|---|
| 2001/0022481 A1 | 9/2001 | Ebihara et al. | |
| 2006/0071571 A1* | 4/2006 | Groening | H02K 1/146 310/214 |
| 2011/0025165 A1* | 2/2011 | Naganawa | H02K 1/165 310/216.069 |
| 2011/0175485 A1* | 7/2011 | Naganawa | H02K 1/146 310/214 |
| 2012/0181893 A1* | 7/2012 | Ikuta | H02K 3/493 310/214 |

FOREIGN PATENT DOCUMENTS

| | | |
|---|---|---|
| JP | 54-39802 A | 3/1979 |
| JP | 2001-258194 A | 9/2001 |
| JP | 2010-239721 A | 10/2010 |
| JP | 2011-151884 A | 8/2011 |

OTHER PUBLICATIONS

International Search Report (PCT/ISA/210) dated Feb. 23, 2016, by the Japanese Patent Office as the International Searching Authority for International Application No. PCT/JP2015/084497.

Written Opinion (PCT/ISA/237) dated Feb. 23, 2016, by the Japanese Patent Office as the International Searching Authority for International Application No. PCT/JP2015/084497.

Office Action dated Dec. 5, 2018, by the Chinese Patent Office in corresponding Chinese Patent Application No. 201580058100.2 and English translation of the Office Action. (12 pages).

* cited by examiner

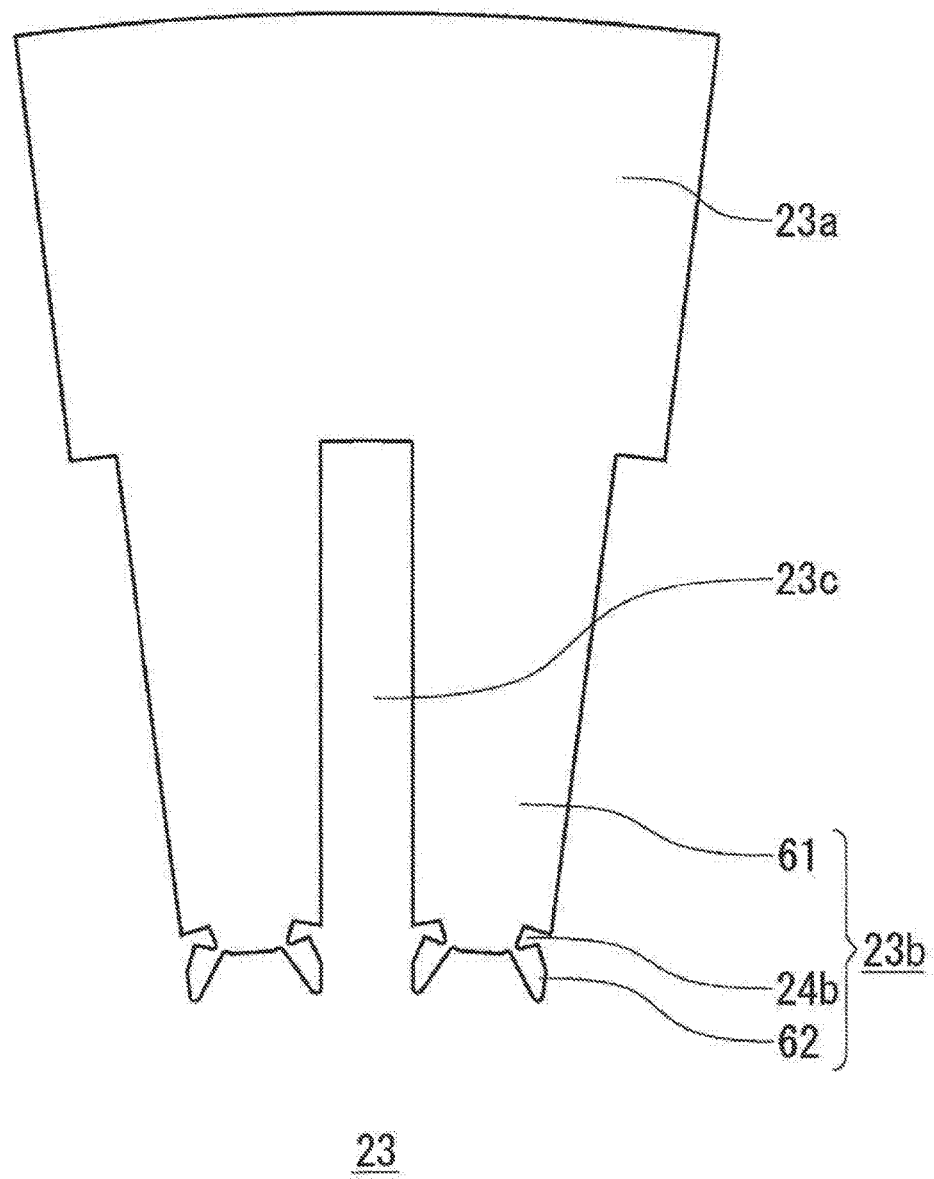

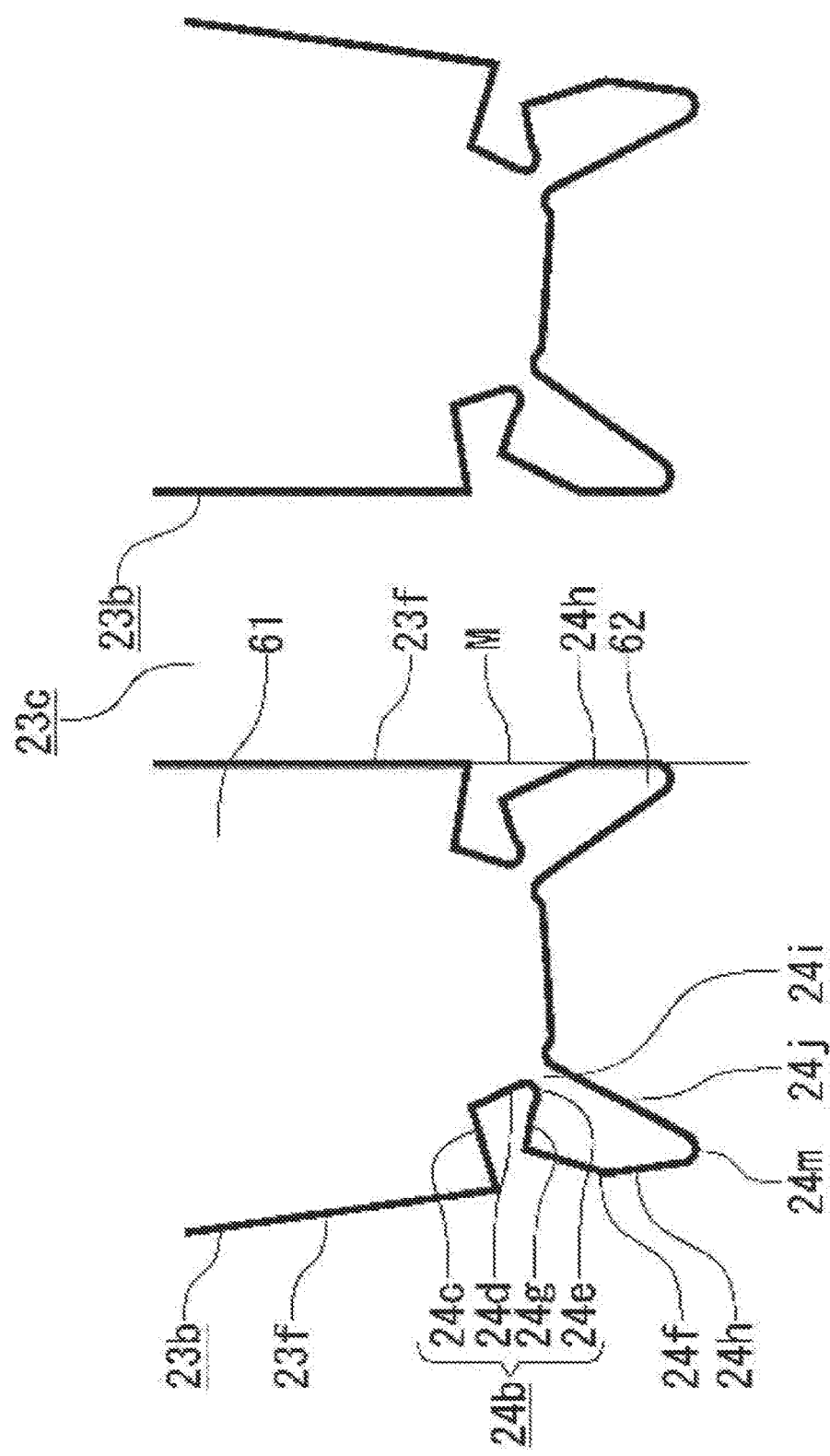

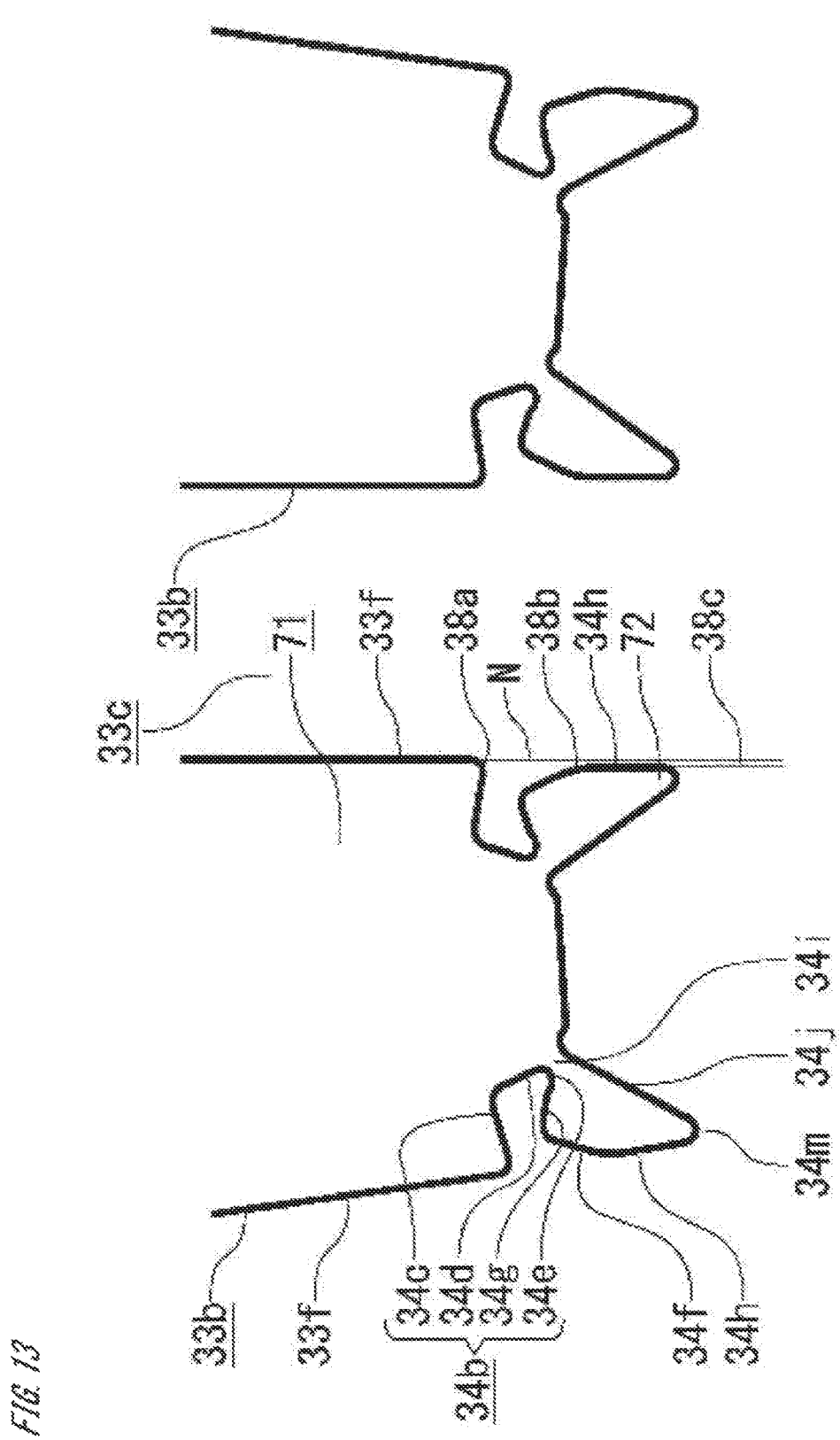

METHOD FOR MANUFACTURING STRATOR, METHOD FOR MANUFACTURING ROTARY ELECTRIC MACHINE, AND IRON-CORE BLOCK

TECHNICAL FIELD

The present invention relates to a method for manufacturing a stator, a method for manufacturing a rotary electric machine, and an iron core block that can narrow a slot opening width, for example.

BACKGROUND ART

In recent years, rotary electric machines such as electric motors and electric generators are required to have high outputs and small sizes. An example means for solving this request is to narrow the width of the slot opening of the stator.

That is, if the slot opening width is narrowed, the magnetic resistance is reduced, and the efficiency of the rotary electric machine is improved. This enables the rotary electric machine to have a small size and high output.

However, there is a problem that if the slot opening width is narrowed, the coil is difficult to be mounted to the slot.

As a stator that solves such a problem, a stator has been proposed in which: a tooth includes a tooth body portion and a tooth tip portion; and after the coil is mounted, the tooth tip portion is opened toward a slot side, which is the outer side in the circumferential direction, to be worked into the form of a shoe, whereby the slot opening width is narrowed (for example, see Patent Document 1).

CITATION LIST

Patent Document

Patent Document 1: Japanese Laid-Open Patent Publication No. 2010-239721 (page 4, FIG. 4)

SUMMARY OF THE INVENTION

Problems to be Solved by the Invention

In the stator described in Patent Document 1, after the coil is mounted to the stator core, a punch disposed at the tooth tip portion is moved toward the outer side in the radial direction from the inner side, thereby pressuring to open the tooth tip portion, thereby directing the tooth tip portion toward the outer side in the circumferential direction.

In the stator core described in Patent Document 1, a cut recessed in the circumferential direction is provided to the connection portion between the tooth body portion and the tooth tip portion. When the tooth tip portion is opened, the tooth tip portion is rotated while undergoing plastic deformation, whereby the face at the tooth body portion side of the cut and the face at the tooth tip portion side of the cut come into contact with each other.

However, since the angle between the face at the tooth body portion side of the cut and the lateral face in the circumferential direction of the tooth body portion is an obtuse angle, a large tensile stress in the circumferential direction acts on the portion that is bent of the connection portion between the tooth body portion and the tooth tip portion. This poses a problem that the tooth tip portion could be broken.

The present invention has been made in order to solve the problem described above. An object of the present invention to obtain a method for manufacturing a stator, a method for manufacturing a rotary electric machine, and an iron core block in which, even when the protrusion as the tooth tip portion is bent so as to be directed in the circumferential direction to be worked into the form of a shoe, the tensile stress is reduced that is generated by the bending and that is applied to the connection portion between the tooth body portion and the shoe, thereby preventing breakage of the shoe.

Solution to the Problems

A method for manufacturing a stator according to the present invention is a method for manufacturing a stator including a stator iron core and a coil to be mounted to the stator iron core, wherein an iron core block forming the stator iron core includes a back yoke portion and a tooth protruding in a radial direction from the back yoke portion, in the iron core block before the coil is mounted thereto, the tooth includes a tooth body portion, and a protrusion provided at an edge in a circumferential direction at a tip in the radial direction of the tooth body portion, and a tooth groove is provided at a border portion between the tooth body portion and the protrusion, the tooth groove being a groove recessed to an inner side in the circumferential direction, an angle between a tooth body portion lateral face which is a lateral face in the circumferential direction of the tooth body portion, and a tooth body portion stop portion which is a face, of the tooth groove, continued from the tooth body portion lateral face is a right angle or an acute angle, and in the protrusion, a protrusion-outer-side lateral face which is an outer-circumferential-side lateral face at a outermost side in the circumferential direction of the protrusion is at a position on an extension line from the tooth body portion lateral face or at a position to the inner side in the circumferential direction relative to the extension line, the method including:

rotating toward the outer side in the circumferential direction the protrusion of the iron core block with the coil mounted thereto, to direct a tip of the protrusion toward the outer side in the circumferential direction, and to bring a protrusion stop portion into close contact with the tooth body portion stop portion, the protrusion stop portion being an outer-circumferential-side lateral face of the protrusion positioned between the protrusion-outer-side lateral face and the tooth groove, thereby forming a shoe in the tooth.

A method for manufacturing a rotary electric machine according to the present invention is a method for manufacturing a rotary electric machine including disposing a rotor concentrically with the stator, wherein the stator is manufactured by the above-described method for manufacturing the stator.

An iron core block according to the present invention is an iron core block including:

a back yoke portion and a tooth protruding in a radial direction from the back yoke portion, wherein in the iron core block, the tooth includes a tooth body portion, and a protrusion provided at an edge in a circumferential direction at a tip in the radial direction of the tooth body portion, and a tooth groove is provided at a border portion between the tooth body portion and the protrusion, the tooth groove being a groove recessed to an inner side in the circumferential direction, an angle between a tooth body portion lateral face which is a lateral face in the circumferential direction of the tooth body portion, and a tooth body portion stop portion which is a face, of the tooth groove, continued from the tooth body portion lateral face is a right angle or an acute angle, and in the protrusion, a protrusion-outer-side lateral face which is an outer-circumferential-side lateral face at a outermost side in the circumferential direction of the protrusion is at a position on an extension line from the tooth body portion lateral face or at a position to the inner side in the circumferential direction relative to the extension line.

Effect of the Invention

According to the present invention, in the iron core block before the coil is mounted thereto, the angle between the tooth body portion lateral face which is a lateral face in the circumferential direction of the tooth body portion and the tooth body portion stop portion which is a face, of the tooth groove, continued from the tooth body portion lateral face is the right angle or an acute angle, and the shoe is formed to the tooth with the protrusion stop portion being in close contact with the tooth body portion stop portion. Thus, even when the protrusion is bent toward the outer side in the circumferential direction to be worked into a shoe, it is possible to reduce tensile stress generated, due to the bending, in the connection portion between the protrusion and the tooth body portion, thereby possible to prevent breakage of the shoe.

BRIEF DESCRIPTION OF THE DRAWINGS

FIG. 3 is a front schematic diagram of the iron core block before the coil is mounted thereto according to embodiment 1 of the present invention.

FIG. 4 is a schematic diagram showing a tip-side portion of teeth in the iron core block shown in FIG. 3.

FIG. 13 is a schematic diagram showing the tip-side portion of the teeth in the iron core block shown in FIG. 12.

DESCRIPTION OF EMBODIMENTS

Hereinafter, a stator and a rotary electric machine according to the present invention will be described with reference to the drawings.

In the present invention, the circumferential direction, the radial direction, and the axial direction respectively refer to the circumferential direction, the radial direction, and the axial direction in the stator or the rotary electric machine, unless otherwise specified.

Embodiment 1

Figure 1:
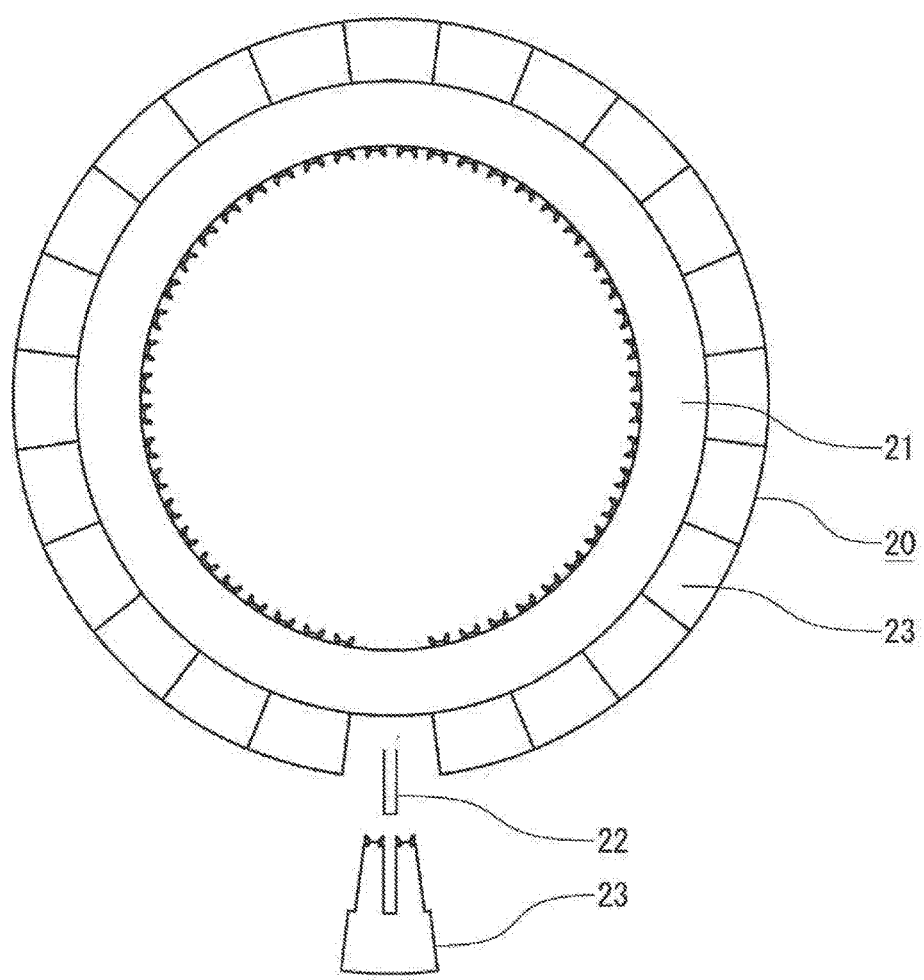
FIG. 1 is a schematic perspective view of an armature according to embodiment 1 of the present invention.

FIG. 1 is a front schematic perspective view of a stator according to embodiment 1 of the present invention.

In the present embodiment, an end face side in the axial direction of the stator is assumed to be the front.

As shown in FIG. 1, a stator 2 of the present embodiment includes a stator iron core 20, a coil 21 mounted to the stator iron core 20, and insulating paper 22 provided between the coil 21 and the stator iron core 20.

The stator iron core 20 is a so-called divided-type stator iron core formed by disposing a plurality of iron core blocks 23 in a ring shape in the circumferential direction. FIG. 1 also shows one iron core block 23 in a state where the stator iron core 20 is not inserted into the coil 21.

In the present embodiment, the stator iron core 20 is a divided-type stator iron core, but the stator iron core may be an integrated-type stator iron core not divided at the back yoke portion formed at the outer side in the radial direction.

The insulating paper 22 insulates the stator iron core 20 from the coil 21. The insulating paper 22 may be a paper piece, but may be an insulating resin sheet that can be bent to form a shape. For example, a fully aromatic polyamide is used. It should be noted that even in a case where the material is a resin, the term insulating paper will be used for the insulating paper 22 in the description.

Figure 2:
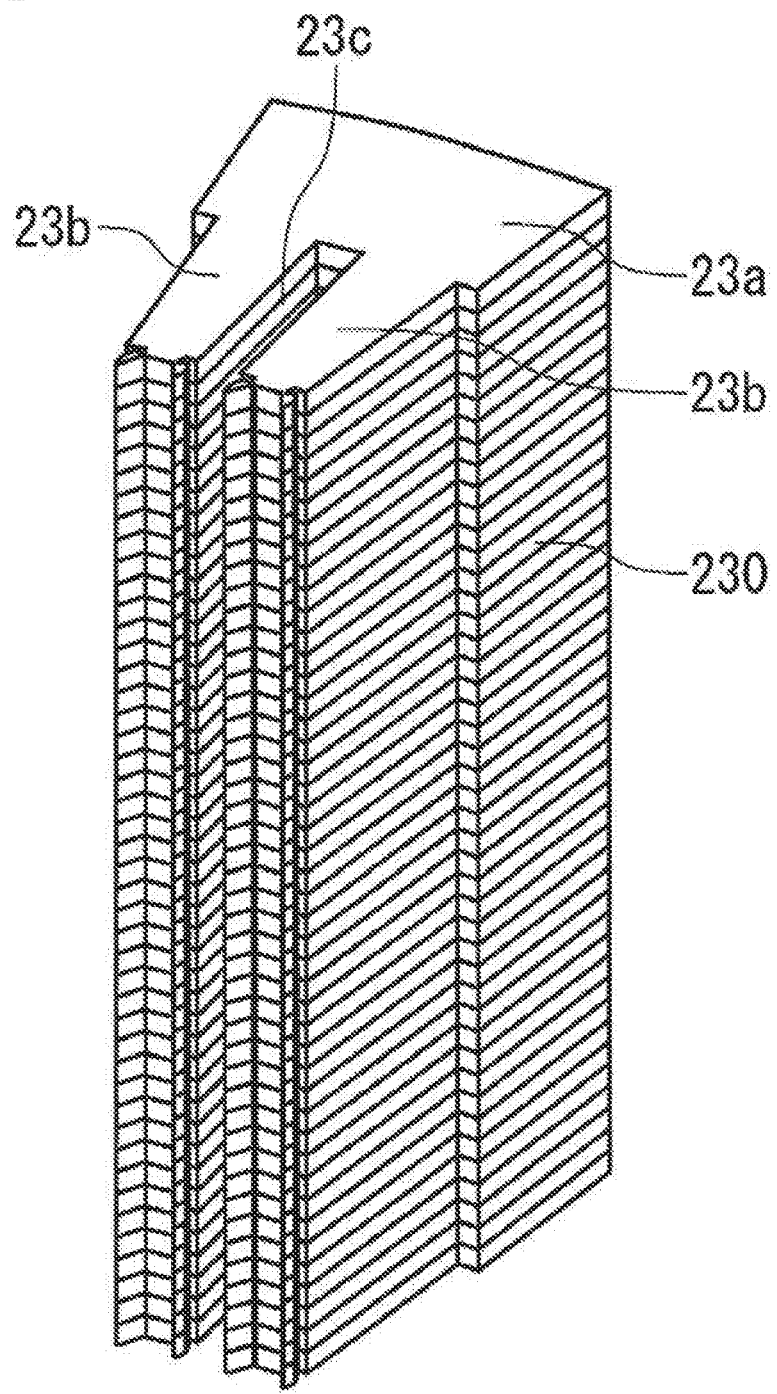
FIG. 2 is a schematic perspective view of an iron core block before a coil to be used in a stator is mounted thereto according to embodiment 1 of the present invention.

FIG. 2 is a schematic perspective view of an iron core block before the coil to be used in the stator is mounted thereto according to embodiment 1 of the present invention.

As shown in FIG. 2, the iron core block 23 before the coil is mounted thereto according to the present embodiment includes: a back yoke portion 23a; and two teeth 23b protruding to the inner side in the radial direction from the back yoke portion 23a. The space between the two teeth 23b, and the space between each tooth 23b and a tooth 23b of an adjacent iron core block 23 each serve as a slot 23c. The coil 21 is provided in the slot 23c.

The iron core block 23 is formed by stacking a plurality of iron core pieces 230 in the axial direction.

For the iron core piece 230, an electromagnetic steel sheet is mainly used, and an electromagnetic steel sheet whose thickness is 0.1 to 1.0 mm is often used.

In the present embodiment, two teeth 23b are provided per iron core block 23, but it is sufficient that one tooth 23b is provided.

FIG. 3 is a front schematic diagram of the iron core block before the coil is mounted thereto according to embodiment 1 of the present invention.

As shown in FIG. 3, in the iron core block 23, the tooth 23b includes a tooth body portion 61 and protrusions 62 at the tip side in the radial direction of the tooth 23b. The protrusions 62 are provided at the tip of the tooth body portion 61, at two positions at the edges on one side and the other side in the circumferential direction.

At the border portion between the tooth body portion 61 and each protrusion 62, a groove (hereinafter, tooth groove) 24b recessed to the inner side in the circumferential direction is provided.

The end at the inner side in the radial direction of the slot 23c serves as a slot opening.

FIG. 4 is a schematic diagram showing the tip-side portion of the teeth in the iron core block 23 shown in FIG. 3.

As shown in FIG. 4, the tooth groove 24b is composed of: a tooth body portion stop portion 24c which is the face continued from a tooth body portion lateral face 23f which is a lateral face in the circumferential direction of the tooth body portion 61; a tooth body portion abutment portion 24d which is the face continued from the tooth body portion stop portion 24c; a relief portion 24e which is the face continued from the tooth body portion abutment portion 24d; and a protrusion abutment portion 24g which is the face continued from the relief portion 24e.

The outer-circumferential-side lateral face of the protrusion 62 continued from the protrusion abutment portion 24g is a protrusion stop portion 24f.

The outer-circumferential-side lateral face of the protrusion 62 continued from the protrusion stop portion 24f is a protrusion-outer-side lateral face 24h. The protrusion-outer-side lateral face 24h is at a position on an extension line M from the tooth body portion lateral face 23f.

The connection portion between the tooth body portion 61 and each protrusion 62 is a bending portion 24i.

The tooth body portion stop portion 24c, the tooth body portion abutment portion 24d, the protrusion abutment portion 24g, and the protrusion stop portion 24f are flat faces, respectively.

A protrusion tip 24m which is the tip of the protrusion 62 has an arc shape in the drawing, but the shape of the protrusion tip 24m is not limited to an arc shape.

Figure 5A:
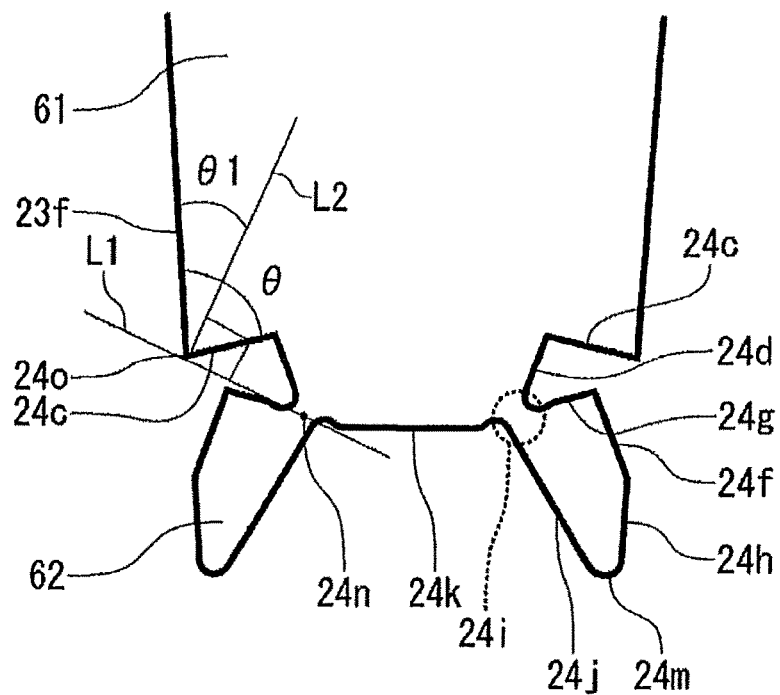
FIGS. 5(a) and 5(b) are schematic diagrams illustrating: a state (a) in which each protrusion in the iron core block is not yet bent toward the outer side in the radial direction; and a state (b) in which each protrusion has been bent into the form of a shoe, according to embodiment 1 of the present invention.

FIGS. 5(a) and (b) are schematic diagrams illustrating: a state (a) in which each protrusion 62 in the iron core block is not yet bent toward the outer side in the radial direction; and a state (b) in which each protrusion 62 has been bent so as to have the form of a shoe 26, according to embodiment 1 of the present invention.

Figure 5B:
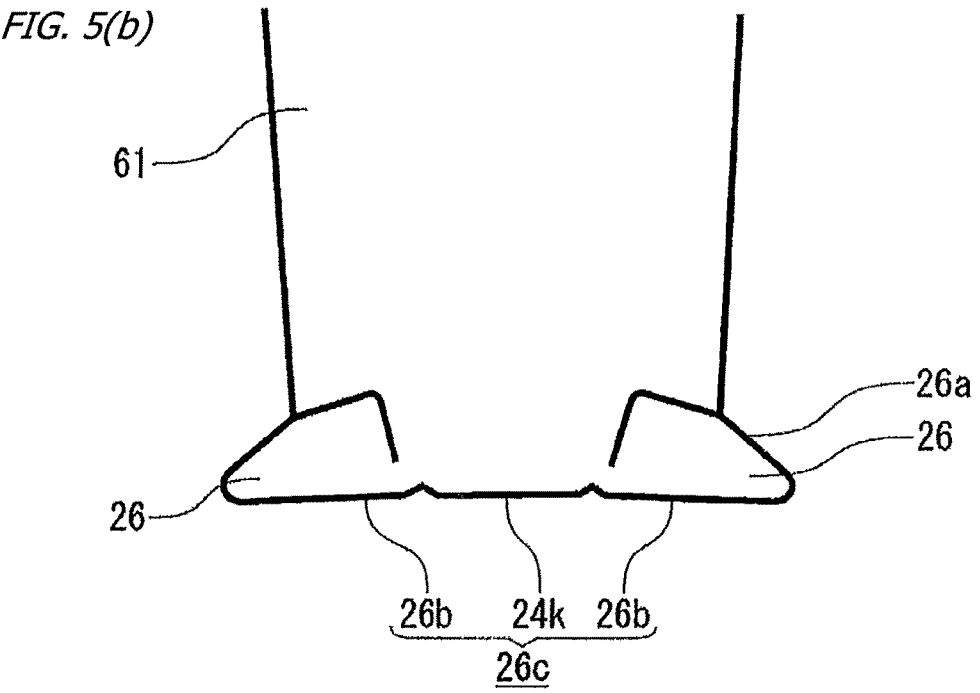

In FIGS. 5(a) and 5(b), only one tooth of the iron core block 23 is shown. The coil 21 and the insulating paper 22 are not shown.

As shown FIGS. 5(a) and 5(b), in the present embodiment, after the coil 21 is mounted to the stator iron core 20, the protrusion 62 is rotated toward the outer side in the circumferential direction about a bending rotation center 24n which is at the bending portion 24i, whereby the protrusion 62 is caused to take the form of the shoe 26.

That is, when the protrusion 62 is bent toward the outer side in the circumferential direction at the bending portion 24i, the protrusion stop portion 24f comes into close contact with the tooth body portion stop portion 24c, and the protrusion abutment portion 24g comes into close contact with the tooth body portion abutment portion 24d. Accordingly, the protrusion tip 24m is oriented toward the outer side in the circumferential direction, whereby the protrusion 62 is caused to take the form of the shoe 26.

When the protrusion 62 is bent to be the shoe 26, the protrusion-outer-side lateral face 24h serves as a shoe-outer-side lateral face 26a, and a protrusion-inner-side lateral face 24j, which is continued from the protrusion tip 24m and which is the lateral face at the inner side in the circumferential direction of the protrusion 62, serves as a shoe-inner-side lateral face 26b.

Thus, a rotor opposing face 26c is formed by: a tooth body portion tip-side end face 24k which is the end face at the tip side in the axial direction of the tooth body portion 61; and two shoe-inner-side lateral faces 26b continued from the tooth body portion tip-side end face 24k. The rotor opposing face 26c is, in the case of a rotary electric machine, a face that is opposed, with an air gap, to the outer circumferential face of the rotor provided to the inner circumferential side.

Next, the structure of the tooth groove 24b of the present embodiment will be described.

As shown in FIG. 5(a), a line that passes through the bending rotation center 24n and through a connection side 24o between the tooth body portion lateral face 23f and the tooth body portion stop portion 24c, and that is parallel to the end face in the axial direction of the tooth 23b, is defined as a line L1. Moreover, a line that is formed perpendicular to the line L1 at the connection side 24o, and that is parallel to the end face in the axial direction of the tooth 23b, is defined as a line L2.

Then, the angle between the line L2 and the tooth body portion lateral face 23f is defined as an angle θ1.

In the present embodiment, relative to the connection side 24o, the bending rotation center 24n is located to the inner side in the radial direction and to the inner side also in the circumferential direction, and thus, the angle θ1 is greater than 0 degrees and smaller than 90 degrees.

In the tooth groove 24b in the iron core block 23 of the present embodiment, a tooth groove angle θ which is the angle between the tooth body portion lateral face 23f and the tooth body portion stop portion 24c is not smaller than the angle θ1 and not greater than 90 degrees. That is, in the tooth groove 24b, the tooth groove angle θ is an acute angle or the right angle.

In addition, the length of the tooth body portion stop portion 24c and the length of the protrusion stop portion 24f are equal to each other, and the length of the tooth body portion abutment portion 24d and the length of the protrusion abutment portion 24g are equal to each other.

Further, the angle between the tooth body portion stop portion 24c and the tooth body portion abutment portion 24d and the angle between the protrusion stop portion 24f and the protrusion abutment portion 24g are equal to each other.

Next, a method for manufacturing a stator of the present embodiment will be described.

Firstly, a magnetic steel sheet is stamped into a predetermined shape, to form the iron core pieces 230.

Secondly, the iron core pieces 230 are stacked to form the iron core block 23.

Thirdly, the insulating paper 22 is mounted to the coil 21 formed in a cylindrical shape.

Fourthly, the teeth 23b are inserted from the outer circumferential side into the coil 21 with the insulating paper 22 mounted thereto. Then, a plurality of iron core blocks 23 whose teeth 23b are inserted in the coil 21 are continuously arranged in the circumferential direction into a ring shape.

Fifthly, the protrusions 62 of each tooth 23b of each iron core block 23 are worked into the shoes 26, thereby creating the stator 2.

Next, a method for forming the shoe 26 by working the protrusion 62 will be described.

Figure 6:
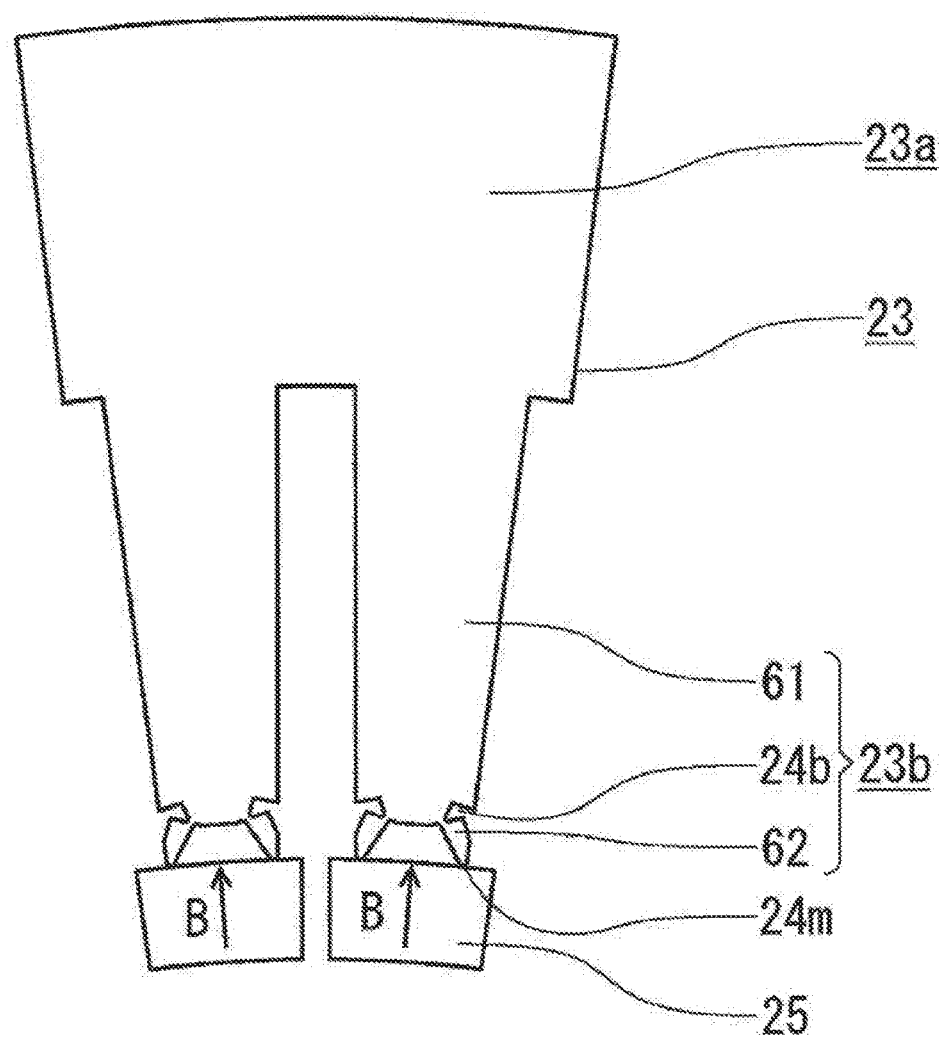
FIG. 6 is a schematic diagram showing a state in which a protrusion work jig is set at the protrusions of the teeth in the iron core block mounted to the coil according to embodiment 1 of the present invention.

FIG. 6 is a schematic diagram showing a state in which a protrusion work jig is set at the protrusions of the teeth in the iron core block mounted to the coil according to embodiment 1 of the present invention.

Figure 7:
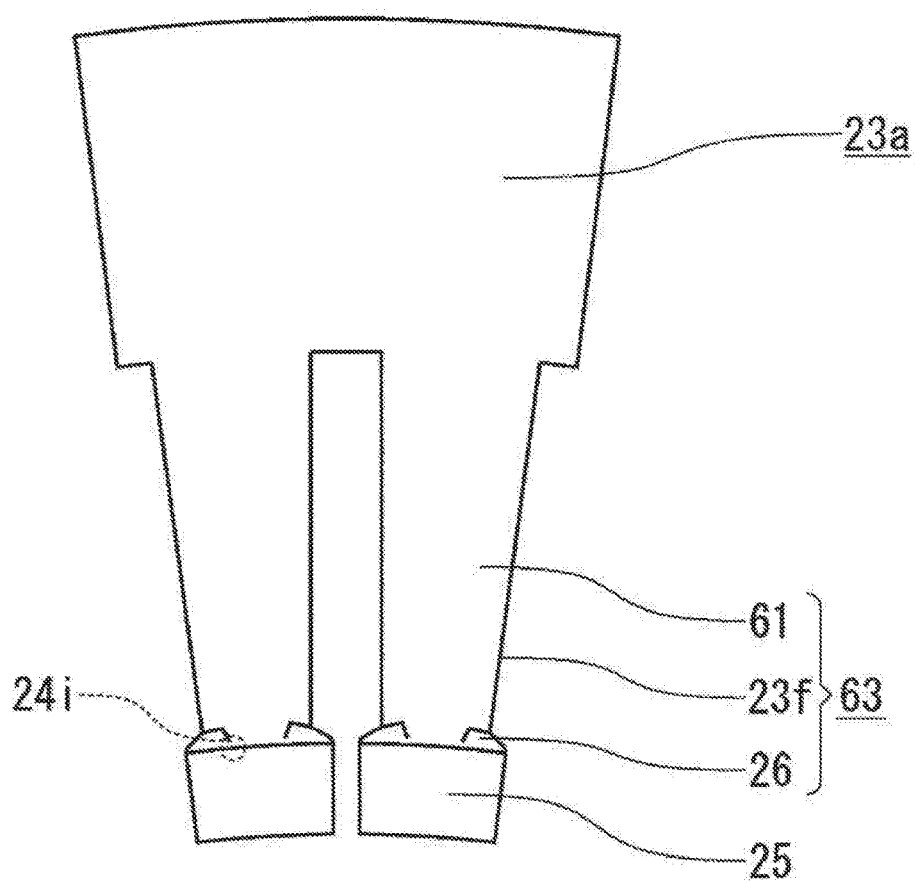
FIG. 7 is a schematic diagram showing a state in which the protrusions of the teeth in the iron core block mounted to the coil are rotated toward the outer sides in the circumferential direction, so as to take the form of the shoes, according to embodiment 1 of the present invention.

FIG. 7 is a schematic diagram showing a state in which the protrusions of the teeth in the iron core block mounted to the coil are rotated toward the outer sides in the circumferential direction, so as to take the form of the shoes, according to embodiment 1 of the present invention.

In FIG. 6 and FIG. 7, the coil 21 and the insulating paper 22 are not shown.

As shown in FIG. 6, the outer face in the radial direction of a push-bending jig 25 whose length is equivalent to or longer than the axial length of the iron core block 23 is brought into contact with the protrusion tip 24m of each protrusion 62.

At this time, all the protrusions 62 at four positions are in contact with the push-bending jig 25.

Next, the bending jig 25 is moved toward the outer side in the radial direction as indicated by an arrow B, whereby each protrusion 62 is rotated toward the outer side in the circumferential direction.

Then, as shown in FIG. 7, in each tooth 23b, the bending portion 24i of each protrusion 62 undergoes plastic deformation, whereby the shoe 26 is formed which protrudes, relative to the tooth body portion lateral face 23f, to the outer side in the circumferential direction, i.e., to the slot side. The tooth having the shoes 26 formed therein will be referred to as a shoe-formed tooth 63.

In the present embodiment, all the protrusions 62 of the iron core block 23 are simultaneously bent by the push-bending jig whose face that comes into contact with the protrusions 62 is in an arc shape. However, instead of simultaneously bending all the protrusions 62 formed in the iron core block 23, the protrusions 62 may be individually bent.

Figure 8:
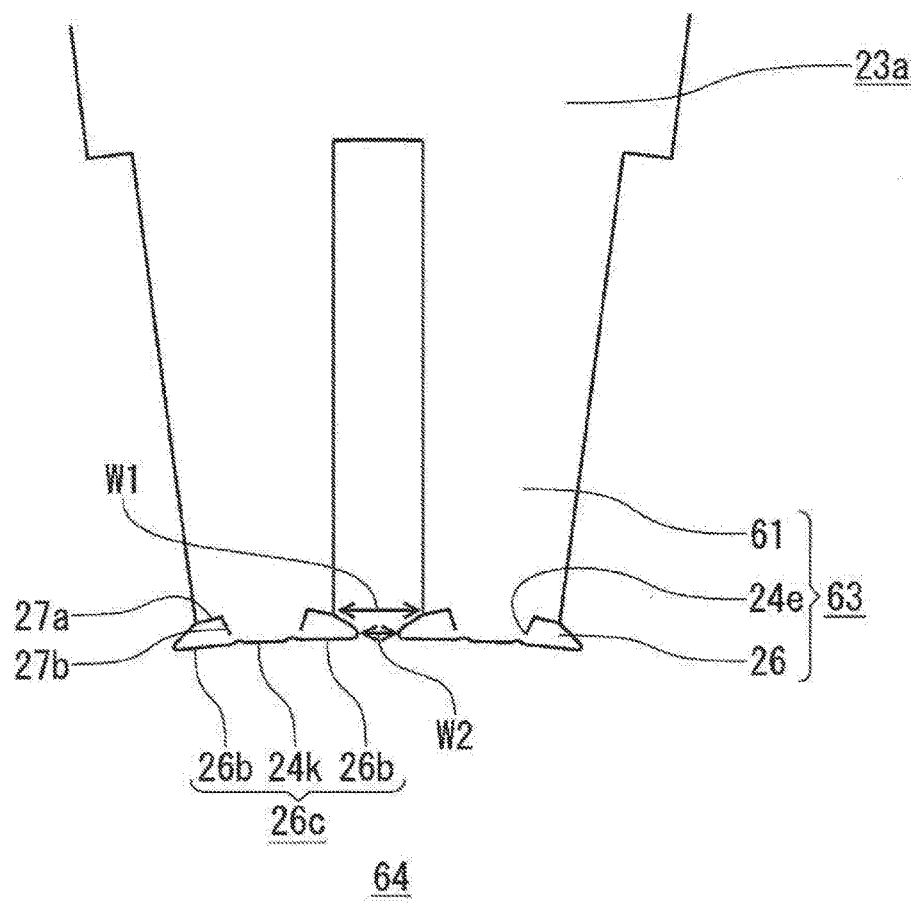
FIG. 8 is a schematic diagram showing the iron core block in which shoes are formed in the teeth of the stator according to embodiment 1 of the present invention.

FIG. 8 is a schematic diagram showing the iron core block in which shoes are formed in the teeth of the stator according to embodiment 1 of the present invention.

Also in FIG. 8, the coil 21 and the insulating paper 22 are not shown.

As shown in FIG. 8, in the shoe-formed tooth 63 having the formed shoes 26, a stop portion contact face 27a is formed where the tooth body portion stop portion 24c and the protrusion stop portion 24f are in contact with each other.

In addition, an abutment portion contact face 27b is formed where the tooth body portion abutment portion 24d and the protrusion abutment portion 24g are in contact with each other.

Further, one shoe-inner-side lateral face 26b, the tooth body portion tip-side end face 24k, and the other shoe-inner-side lateral face 26b are arranged on the same circumference, thereby serving as the rotor opposing face 26c.

The relief portion 24e has a shape that reduces tensile stress generated in the bending portion 24i when the shoe 26 is to be formed. However, after the formation of the shoe 26, the relief portion 24e is reduced in size as much as possible in order to ensure the magnetic path.

In a shoe-formed iron core block 64 in which the shoes are formed in the teeth, a shoe interval W2 which is the interval in the circumferential direction between adjacent shoes 26 is narrower than a slot opening width W1, and is an interval that does not allow the coil 21 and the insulating paper 22 to come off the slot 23c. Further, after the shoe-formed block 64 is formed, the shoes 26 protrude in the circumferential direction of the tooth body portion lateral face 23f and to the side where the shoe interval W2 is narrowed.

Next, effects of the stator 2 of the present embodiment will be described.

Figure 9:
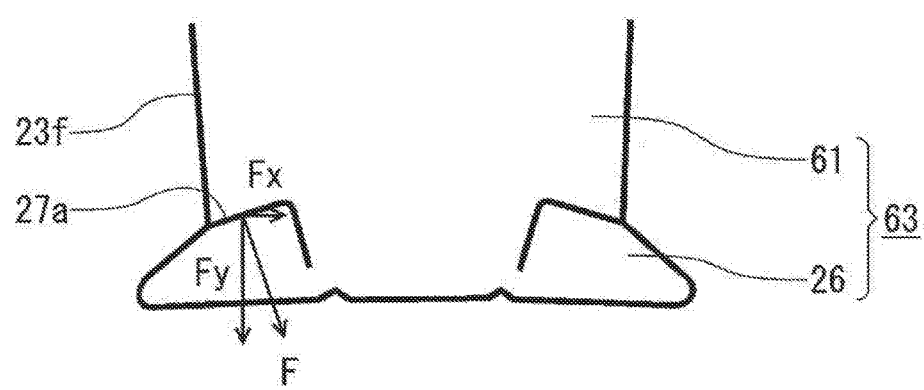
FIG. 9 is a schematic diagram illustrating the stress generated at the tooth having the shoes formed therein, in the stator according to embodiment 1 of the present invention.

FIG. 9 is a schematic diagram illustrating the stress generated at the tooth having the shoes formed therein, in the stator according to embodiment 1 of the present invention.

In the stator 2 of the present embodiment, when a force is applied to the protrusion 62 of the iron core block 23 to rotate the protrusion 62 toward the outer side in the circumferential direction such that the protrusion 62 takes the form of the shoe 26, a tensile stress σt acts at the inner side in the radial direction of the bending portion 24i, and a compressive stress σc acts at the outer side in the radial direction of the bending portion 24i.

To the stop portion contact face 27a formed by the tooth body portion stop portion 24c and the protrusion stop portion 24f being in contact with each other, a reaction force F in the perpendicular direction to this face 27a is applied.

In a case where the tooth groove angle θ is an acute angle, the radial direction component Fy of the reaction force F is directed to the inner side in the radial direction, and the circumferential direction component Fx thereof is directed to the inner side in the circumferential direction from the tooth body portion lateral face 23f. In this case, the tensile stress σt at the inner side in the radial direction of the bending portion 24i is reduced, and the compressive stress σc at the outer side in the radial direction is increased. Accordingly, the effect of preventing breakage of the shoe 26 is improved.

That is, the manufacturing yield of the stator is improved, and thus, the productivity of the stator and the rotary electric machine can be further improved and the cost thereof can be further reduced.

The effect of the stress generated at the bending portion 24i in the stator 2 of the present embodiment will be described in comparison with the stator described in Patent Document 1.

Figure 10:
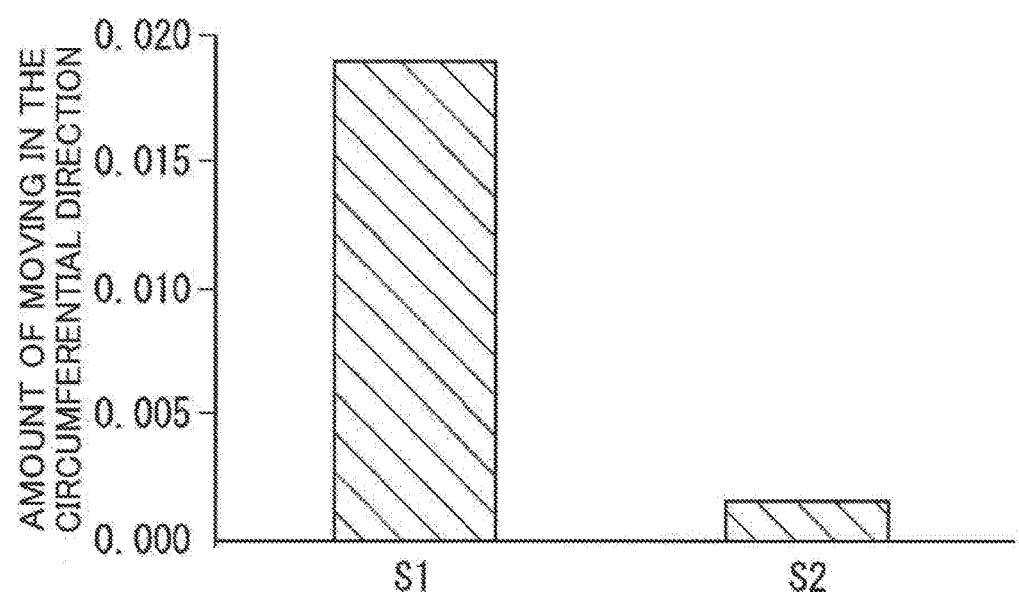
FIG. 10 is a graph of relative expression of the amount by which, in a case where the shoe is formed by rotating the protrusion of the stator according to embodiment 1 of the present invention, the protrusion is moved toward the outer side in the circumferential direction after the face of the tooth body portion is brought into contact with the face of the protrusion.

FIG. 10 is a graph of relative expression of the amount by which, in a case where the shoe 26 is formed by rotating the protrusion 62 of the stator according to embodiment 1 of the present invention, the protrusion is moved toward the outer side in the circumferential direction after the face of the tooth body portion is brought into contact with the face of the protrusion.

In FIG. 10, S1 is data of the stator 2 of the present embodiment, and S2 is data of the stator described in Patent Document 1 used for comparison.

As shown in FIG. 10, the moving amount of the protrusion in the stator of Patent Document 1 is 0.0187 mm in average, whereas the moving amount of the protrusion in the stator 2 of the present embodiment is 0.0015 mm in average, which is very small. This is due to the fact that the tooth groove angle θ of the stator 2 of the present embodiment is an acute angle or the right angle.

In addition, the moving amount of the protrusion results in a strain in the bending portion 24i, and thus, has correlation with the stress in the bending portion 24i. That is, the stator 2 of the present embodiment has a smaller moving amount of the protrusion than the stator of Patent Document 1, and thus, the stress generated at the bending portion 24i is small. Also from this point, breakage of the shoe 26 can be prevented.

In addition, since the moving amount of the protrusion is small, variation in the position of the formed shoe 26 can be reduced.

In the stator 2 of the present embodiment, as a result of formation of the shoes 26, the interval W2 between the shoes 26 is made narrower than the width W1 of the slot opening. Thus, it is possible to prevent the coil 21 and the insulating paper 22 from coming off the slot 23c, and it is possible to have greater interlinkage flux of the coil.

In the present embodiment, the protrusion abutment portion 24g and the tooth body portion abutment portion 24d are in close contact with each other. However, as long as the protrusion stop portion 24f and the tooth body portion stop portion 24c are in close contact with each other, the protrusion abutment portion 24g and the tooth body portion abutment portion 24d may not be in close contact with each other.

Although the protrusion-outer-side lateral face 24h is at a position on the extension line M, the protrusion-outer-side lateral face 24h may be at a position to the inner side in the circumferential direction relative to the extension line M. In this case, insertion of the tooth 23b into the coil having the insulating paper mounted thereto is facilitated.

Although the tooth groove 24b is provided with the relief portion 24e, the relief portion 24e may be omitted.

In the present embodiment, the tooth body portion stop portion 24c, the tooth body portion abutment portion 24d, the protrusion abutment portion 24g, and the protrusion stop portion 24f are flat faces, but may be curved faces, respectively. In this case, the angle between the tooth body portion lateral face 23f and the tangential line at the connection side 24o of the tooth body portion stop portion 24c is used as the tooth groove angle θ which is the angle between the tooth body portion lateral face 23f and the tooth body portion stop portion 24c.

Embodiment 2

The stator of the present embodiment is the same as the stator 2 of embodiment 1 except that the shape of the tooth tip portion of the iron core block is different.

Figure 11:
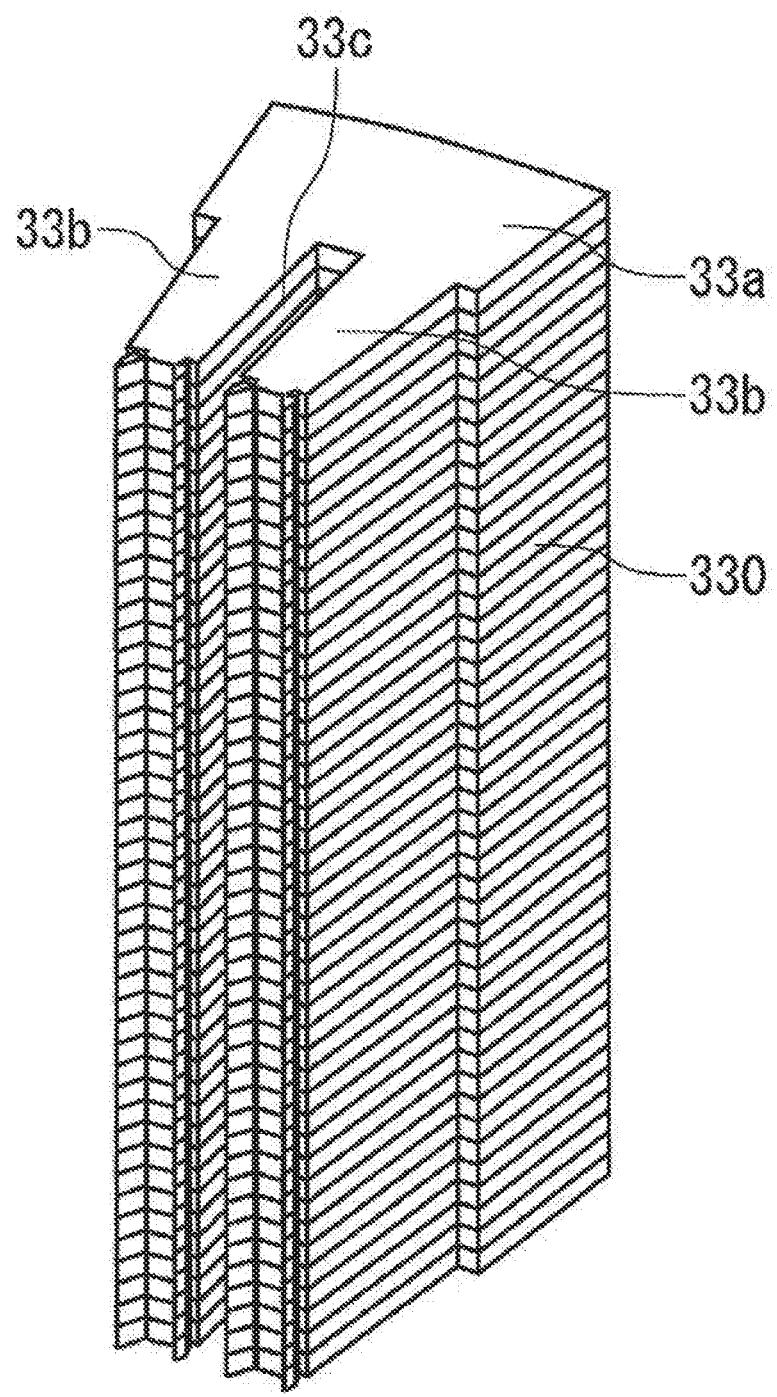
FIG. 11 is a schematic perspective view of an iron core block before the coil to be used in the stator is mounted thereto according to embodiment 2 of the present invention.

FIG. 11 is a schematic perspective view of an iron core block before the coil to be used in the stator is mounted thereto according to embodiment 2 of the present invention.

Figure 12:
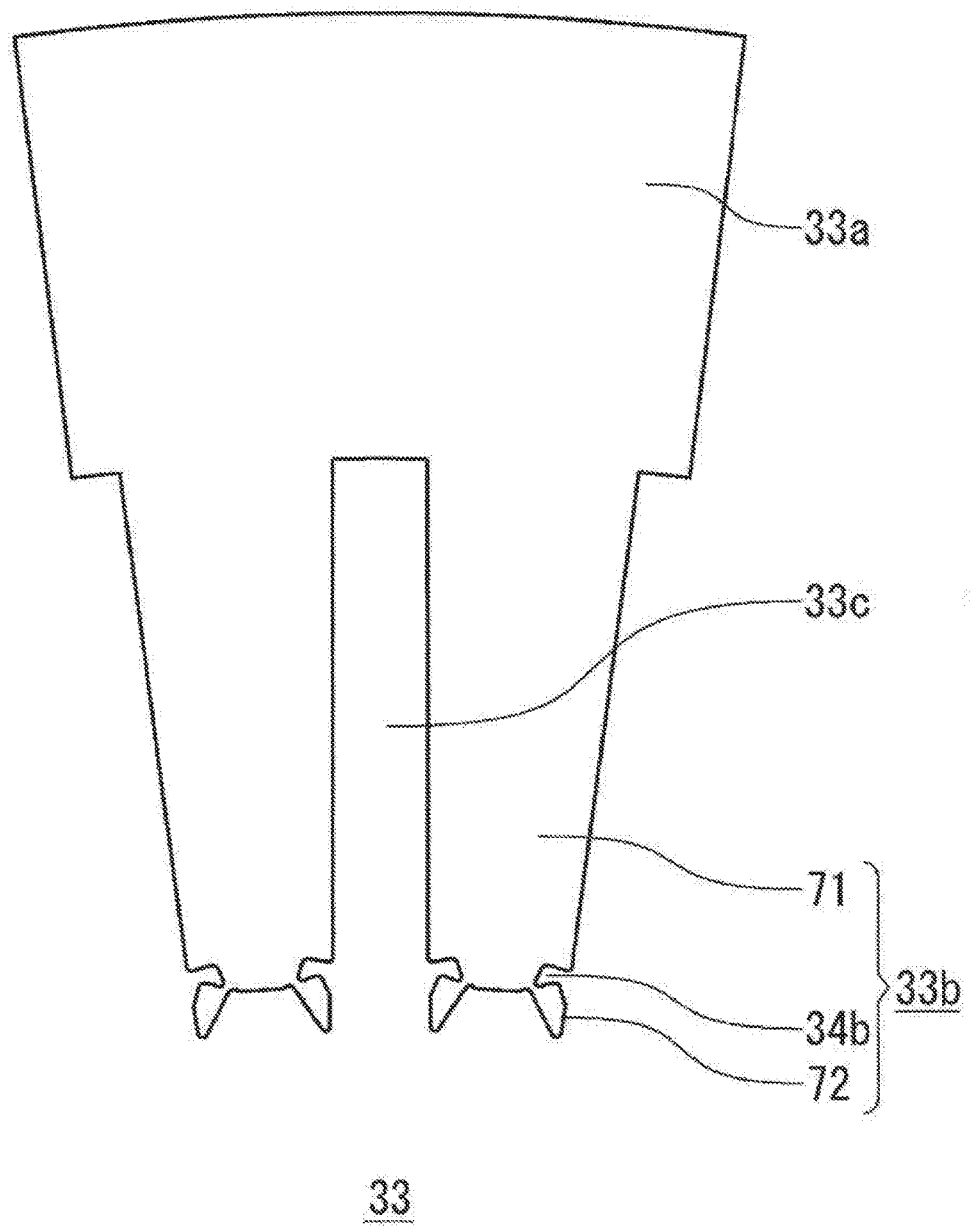
FIG. 12 is a front schematic diagram of the iron core block before the coil is mounted thereto according to embodiment 2 of the present invention.

FIG. 12 is a front schematic diagram of the iron core block before the coil is mounted thereto according to embodiment 2 of the present invention.

As shown in FIG. 11, an iron core block 33 before the coil is mounted thereto according to the present embodiment is formed by stacking a plurality of iron core pieces 330 in the axial direction.

As shown in FIG. 11 and FIG. 12, the iron core block 33 includes: a back yoke portion 33a; and two teeth 33b protruding to the inner side in the radial direction from the back yoke portion 33a. The space between the two teeth 33b, and the space between each tooth 33b and a tooth 33b of an adjacent iron core block 33 each serve as a slot 33c.

As shown in FIG. 12, the tooth 33b includes a tooth body portion 71 and protrusions 72 at the tip side in the radial direction of the tooth 33b. The protrusions 72 are provided at the tip of the tooth body portion 71, at two positions at the edges on one side and the other side in the circumferential direction.

At the border portion between the tooth body portion 71 and each protrusion 72, a tooth groove 34b which is a groove recessed to the inner side in the circumferential direction is provided.

The end at the inner side in the radial direction of the slot 33c serves as a slot opening.

FIG. 13 is a schematic diagram showing the tip-side portion of the teeth in the iron core block shown in FIG. 12.

As shown in FIG. 13, the tooth groove 34b is composed of: a tooth body portion stop portion 34c which is the face continued from a tooth body portion lateral face 33f which is a lateral face in the circumferential direction of the tooth body portion 71; a tooth body portion abutment portion 34d which is the face continued from the tooth body portion stop portion 34c; a relief portion 34e which is the face continued from the tooth body portion abutment portion 34d; and a protrusion abutment portion 34g which is the face continued from the relief portion 34e.

The outer-circumferential-side lateral face of the protrusion 72 continued from the protrusion abutment portion 34g is a protrusion stop portion 34f.

The outer-circumferential-side lateral face of the protrusion 72 continued from the protrusion stop portion 34f is a protrusion-outer-side lateral face 34h.

The tooth body portion stop portion 34c, the tooth body portion abutment portion 34d, the protrusion abutment portion 34g, and the protrusion stop portion 34f are flat faces, respectively.

In the tooth body portion 71, the connection portion between the tooth body portion lateral face 33f and the tooth body portion stop portion 34c is a tooth body portion arc portion 38a which is an arc face.

In the protrusion 72, the connection portion between the protrusion stop portion 34f and the protrusion-outer-side lateral face 34h is a protrusion arc portion 38b which is an arc face.

The radius of the protrusion arc portion 38b is greater than the radius of the tooth body portion arc portion 38a.

The protrusion-outer-side lateral face 34h is parallel to an extension line N from the tooth body portion lateral face 33f. However, as long as the protrusion-outer-side lateral face 34h is at a position to the inner side in the circumferential direction relative to the extension line N, the protrusion-outer-side lateral face 34h may not be parallel to the extension line N.

Although the protrusion-outer-side lateral face 34h is at a position to the inner side in the circumferential direction relative to the extension line N, the protrusion-outer-side lateral face 34h may be at a position on the extension line N.

In a case where the protrusion-outer-side lateral face 34h is at a position to the inner side in the circumferential direction relative to the extension line N, a gap 38c is formed between the protrusion-outer-side lateral face 34h and the extension line N.

The connection portion between the tooth body portion 71 and each protrusion 72 is a bending portion 34i.

The shape of the protrusion tip 34m which is the tip of the protrusion 72 has an arc shape, but the shape of the protrusion tip 34m is not limited to an arc shape.

Figure 14A:
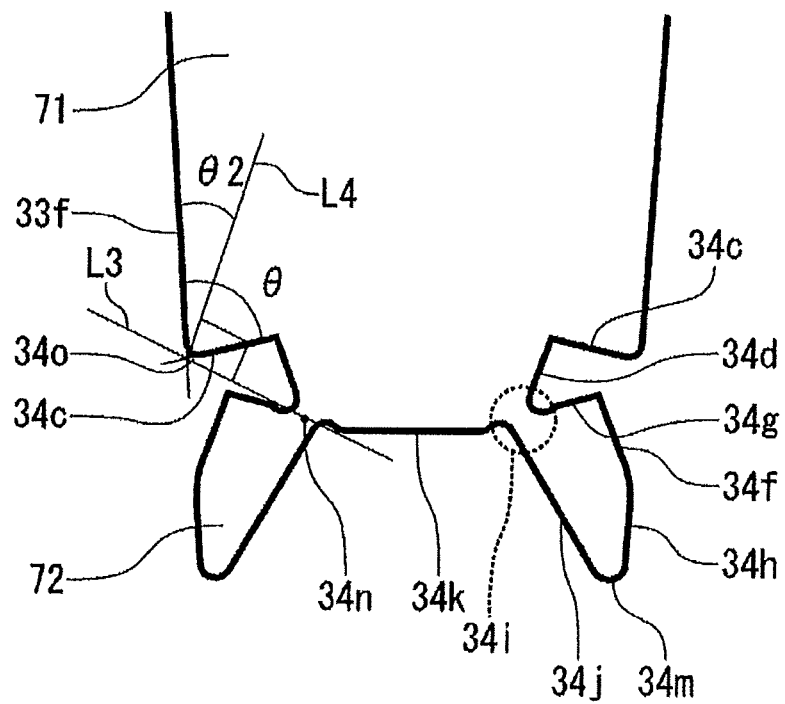
FIGS. 14(a) and 14(b) are schematic diagrams illustrating: a state (a) in which each protrusion in the iron core block is not yet bent toward the outer side in the radial direction; and a state (b) in which each protrusion has been bent so as to have the form of a shoe, according to embodiment 2 of the present invention.

FIGS. 14(a) and (b) are schematic diagrams illustrating: a state (a) in which each protrusion 72 in the iron core block is not yet bent toward the outer side in the radial direction; and a state (b) in which each protrusion 72 has been bent so as to have the form of a shoe 36, according to embodiment 2 of the present invention.

Figure 14B:
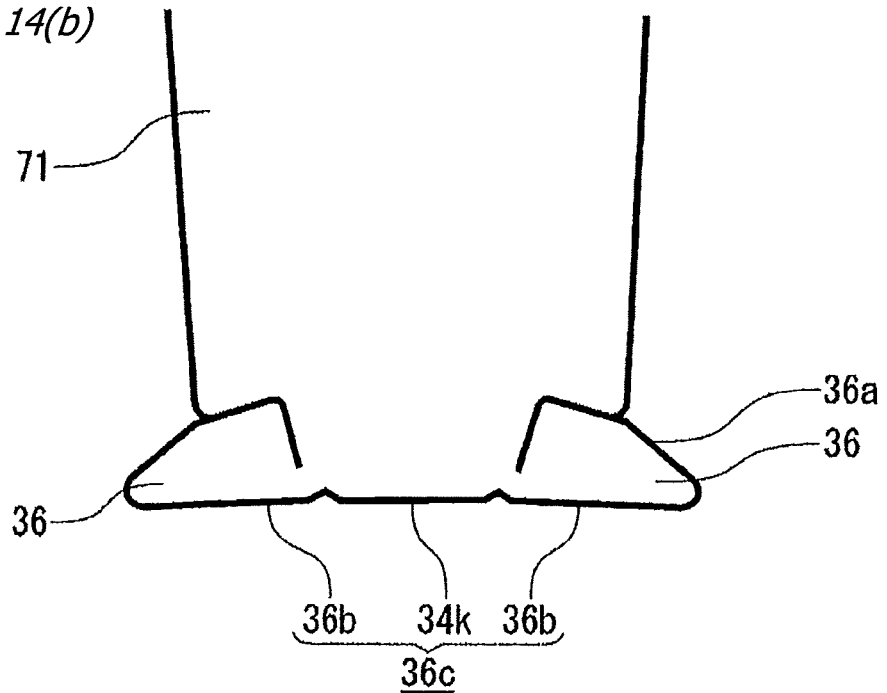

In FIGS. 14(a) and 14(b), only one tooth of the iron core block 33 is shown. The coil 21 and the insulating paper 22 are not shown.

As shown in FIGS. 14(a) and 14(b), in the present embodiment, the protrusion 72 is rotated toward the outer side in the circumferential direction about a bending rotation center 34n which is at the bending portion 34i, whereby the protrusion 72 is worked into the form of the shoe 36.

That is, when the protrusion 72 is bent toward the outer side in the circumferential direction at the bending portion 34i, the protrusion stop portion 34f comes into close contact with the tooth body portion stop portion 34c, and the protrusion abutment portion 34g comes into close contact with the tooth body portion abutment portion 34d. In addition, the protrusion tip 34m is oriented toward the outer side in the circumferential direction, whereby the protrusion 72 is caused to take the form of the shoe 36.

When the protrusion 72 is bent so as to take the form of the shoe 36, the protrusion-outer-side lateral face 34h is caused to take the form of a shoe-outer-side lateral face 36a, and a protrusion-inner-side lateral face 34j which is the lateral face at the inner side in the circumferential direction of the protrusion 72 continued from the protrusion tip 34m is caused to take the form of a shoe-inner-side lateral face 36b.

Thus, a rotor opposing face 36c is formed by: a tooth body portion tip-side end face 34k which is the end face at the tip side in the axial direction of the tooth body portion 71; and two shoe-inner-side lateral faces 36b continued from the tooth body portion tip-side end face 34k. The rotor opposing face 36c is, in the case of a rotary electric machine, a face that is opposed, with an air gap, to the outer circumferential face of the rotor provided to the inner circumferential side.

Next, the structure of the tooth groove 34b of the present embodiment will be described.

As shown in FIG. 14(a), a line that passes through the bending rotation center 34n and through a cross portion 34o at which the extension face of the tooth body portion lateral face 33f and the extension face of the tooth body portion stop portion 24c cross each other, and that is parallel to the end face in the axial direction of the tooth 33b, is defined as a line L3. Moreover, a line that is formed perpendicular to the line L3 at the cross portion 34o, and that is parallel to the end face in the axial direction of the tooth 33b, is defined as a line L4.

Then, the angle between the line L4 and the tooth body portion lateral face 33f is defined as an angle θ2.

In the present embodiment, relative to the cross portion 34o, the bending rotation center 34n is located to the inner side in the radial direction, and to the inner side in the circumferential direction, and thus, the angle θ2 is greater than 0 degrees and smaller than 90 degrees.

In the tooth groove 34b in the iron core block 33 of the present embodiment, the tooth groove angle θ which is the angle between the tooth body portion lateral face 33f and the tooth body portion stop portion 34c is not smaller than the angle θ2 and not greater than 90 degrees. That is, in the tooth groove 34b, the tooth groove angle θ is an acute angle or the right angle.

In addition, the length of the tooth body portion abutment portion 34d and the length of the protrusion abutment portion 34g are equal to each other, and the length of the tooth body portion abutment portion 34d and the length of the protrusion abutment portion 34g are equal to each other.

Further, the angle between the tooth body portion stop portion 34c and the tooth body portion abutment portion 34d and the angle between the protrusion stop portion 34f and the protrusion abutment portion 34g are equal to each other.

The method for manufacturing the stator of the present embodiment is the same as that of embodiment 1, although the shape of the iron core piece is different.

In addition, the method for forming the shoe 36 by working the protrusion 72 after the coil is mounted to the stator iron core is the same as that of embodiment 1.

Figure 15:
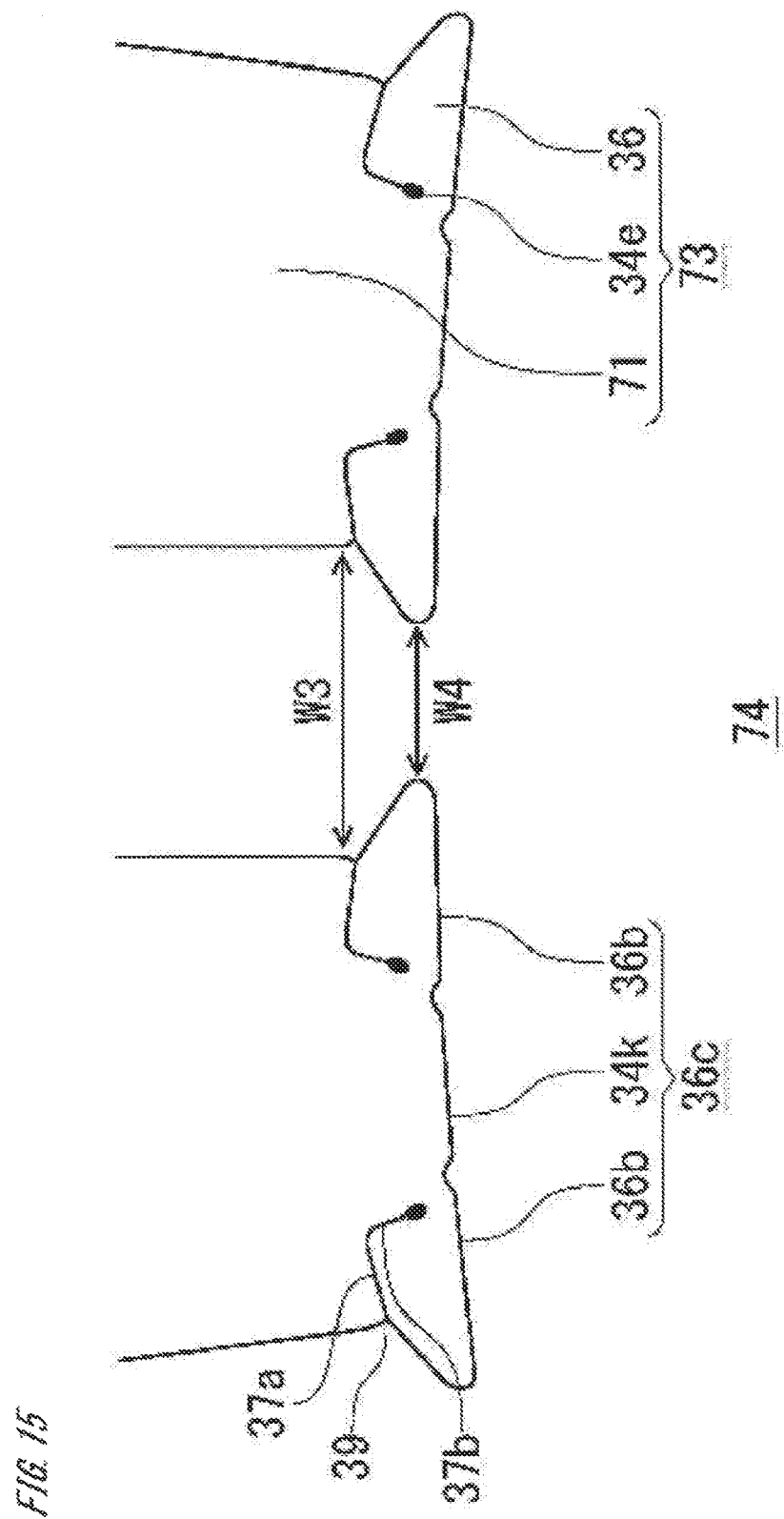
FIG. 15 is a schematic diagram showing the tip-side portion of the teeth of the iron core block in which the shoes are formed, in the stator according to embodiment 2 of the present invention.

FIG. 15 is a schematic diagram showing the tip-side portion of the teeth of the iron core block in which the shoes are formed, in the stator according to embodiment 2 of the present invention.

Also in FIG. 15, the coil 21 and the insulating paper 22 are not shown.

As shown in FIG. 15, in a shoe-formed tooth 73 in which the shoes 36 are formed, a stop portion contact face 37a is formed which is the face where the tooth body portion stop portion 34c and the protrusion stop portion 34f are in contact with each other. In addition, an abutment portion contact face 37b is formed which is the face where the tooth body portion abutment portion 34d and the protrusion abutment portion 34g are in contact with each other.

Further, one shoe-inner-side lateral face 36b, the tooth body portion tip-side end face 34k, and the other shoe-inner-side lateral face 36b are arranged on the same circumference, thereby serving as the rotor opposing face 36c.

The relief portion 34e has a shape that reduces tensile stress generated in the bending portion 34i when the shoe 36 is to be formed. However, after the formation of the shoe 36, the relief portion 34e is reduced in size as much as possible in order to ensure the magnetic path.

An arc portion contact portion 39 which is the contact portion between the tooth body portion arc portion 38a and the protrusion arc portion 38b is configured to have as little a gap as possible in order to ensure the magnetic path.

In a shoe-formed iron core block 74 after the shoes 36 are formed, a shoe interval W4 which is the interval in the circumferential direction between adjacent shoes 36 is narrower than a slot opening width W3, and is an interval that does not allow the coil and the insulating paper to come off the slot 33c.

Next, effects of the stator of the present embodiment will be described.

Also in the stator of the present embodiment, in a case where the tooth groove angle θ is an acute angle, reaction force similar to that in the stator of embodiment 1 acts on the stop portion contact face 37a. Thus, the tensile stress of at the inner side in the radial direction of the bending portion 34i is reduced, and the compressive stress σc at outer side in the radial direction is increased. Accordingly, the effect of preventing breakage of the shoe 36 is improved.

That is, the manufacturing yield of the stator is improved, and thus, the productivity of the stator and the rotary electric machine can be improved and the cost thereof can be reduced.

Since the tooth groove angle θ is an acute angle or the right angle, the moving amount of the protrusion is small. That is, variation in the position of the formed shoe 36 is reduced. Further, stress generated in the bending portion 34i is reduced. Also from this point, breakage of the shoe 36 can be prevented.

Since the shoe interval is narrower than the slot opening width, it is possible to have greater interlinkage flux of the coil.

As shown in FIG. 13, in the stator of the present embodiment, in a case where the protrusion-outer-side lateral face 34h is located to the inner side in the circumferential direction relative to the extension line N from the tooth body portion lateral face 33f, insertion of the tooth 33b into the coil having insulating paper mounted thereto is facilitated.

In addition, the tooth body portion arc portion 38a is provided to the tooth body portion 71, and the protrusion arc portion 38b is provided to the protrusion 72. This reduces the possibility of damaging the insulating paper or the coil when the tooth 33b is to be inserted into the coil having the insulating paper mounted thereto.

In the present embodiment, the protrusion abutment portion 34g and the tooth body portion abutment portion 34d are in close contact with each other. However, as long as the protrusion stop portion 34f and the tooth body portion stop portion 34c are in close contact with each other, the protrusion abutment portion 34g and the tooth body portion abutment portion 34d may not be in close contact with each other.

Although the relief portion 34e is provided to the tooth groove 34b, the relief portion 34e may be omitted.

In the present embodiment, the tooth body portion stop portion 34c, the tooth body portion abutment portion 34d, the protrusion abutment portion 24g, the protrusion stop portion 24f are flat faces, but may be curved faces, respectively. In this case, the angle between the tooth body portion lateral face 33f and the tangential line at the outer side end in the circumferential direction of the tooth body portion stop portion 34c is used as the tooth groove angle θ which is the angle between the tooth body portion lateral face 33f and the tooth body portion stop portion 34c.

Embodiment 3

The stator of the present embodiment is the same as the stator 2 of embodiment 1 except that the shape of the tooth tip portion of the iron core block is different.

Figure 16:
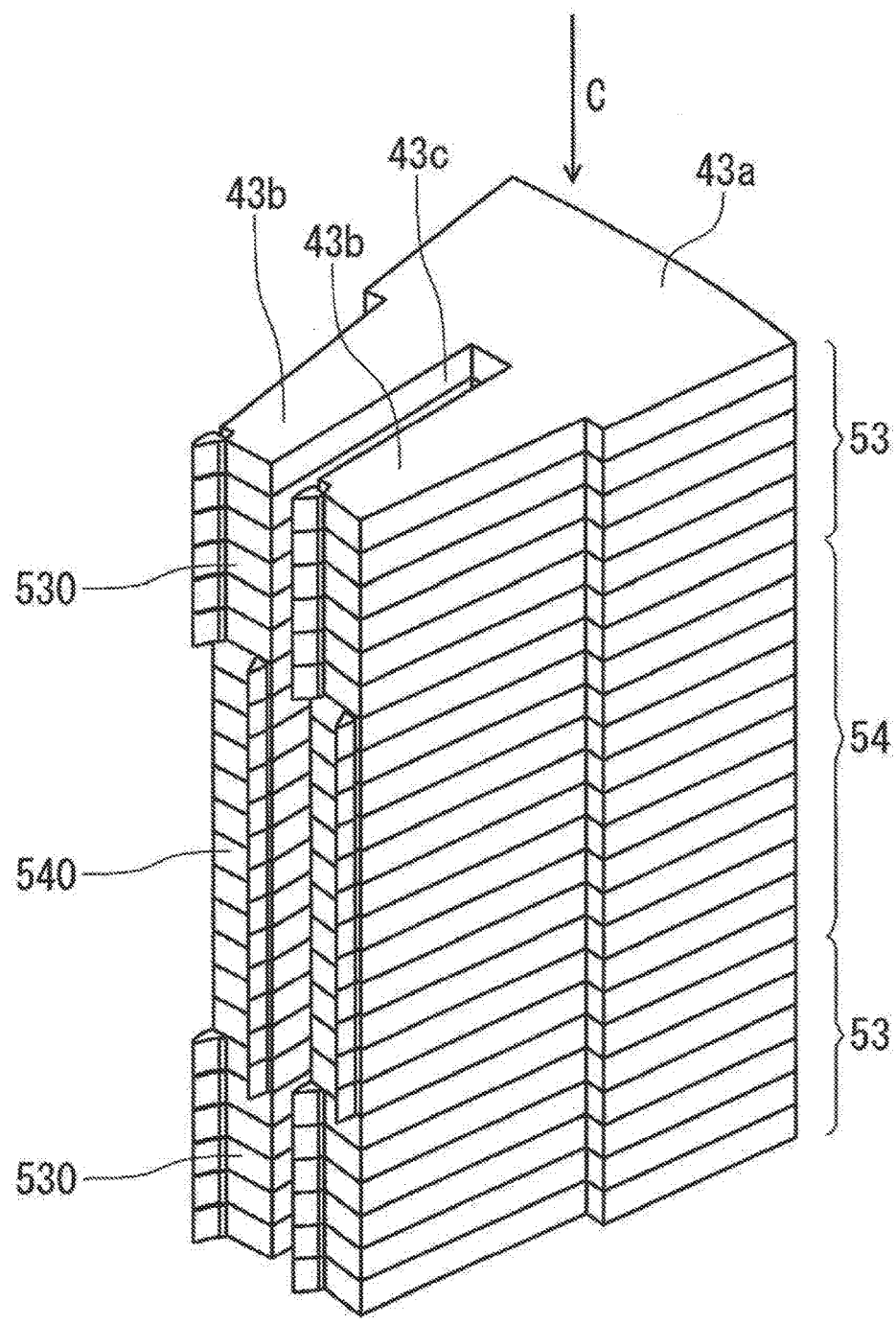
FIG. 16 is a schematic perspective view of an iron core block before the coil to be used in the stator is mounted thereto according to embodiment 3 of the present invention.

FIG. 16 is a schematic perspective view of an iron core block before the coil to be used in the stator is mounted thereto according to embodiment 3 of the present invention.

As shown in FIG. 16, an iron core block 43 before the coil is mounted thereto according to the present embodiment includes: a back yoke portion 43a; and two teeth 43b protruding to the inner side in the radial direction from the back yoke portion 43a. The space between the two teeth 43b, and the space between each tooth 43b and a tooth 43b of an adjacent iron core block 43 each serve as a slot 43c.

As shown in FIG. 16, the iron core block 43 is composed of: first iron core blocks 53 at both sides in the axial direction; and a second iron core block 54 at an intermediate portion in the axial direction.

The first iron core block 53 is formed by stacking iron core pieces 530 in the axial direction. The second iron core block 54 is formed by stacking iron core pieces 540 in the axial direction.

As the iron core piece 540, the iron core piece 530 that is reversed may be used.

Figure 17:
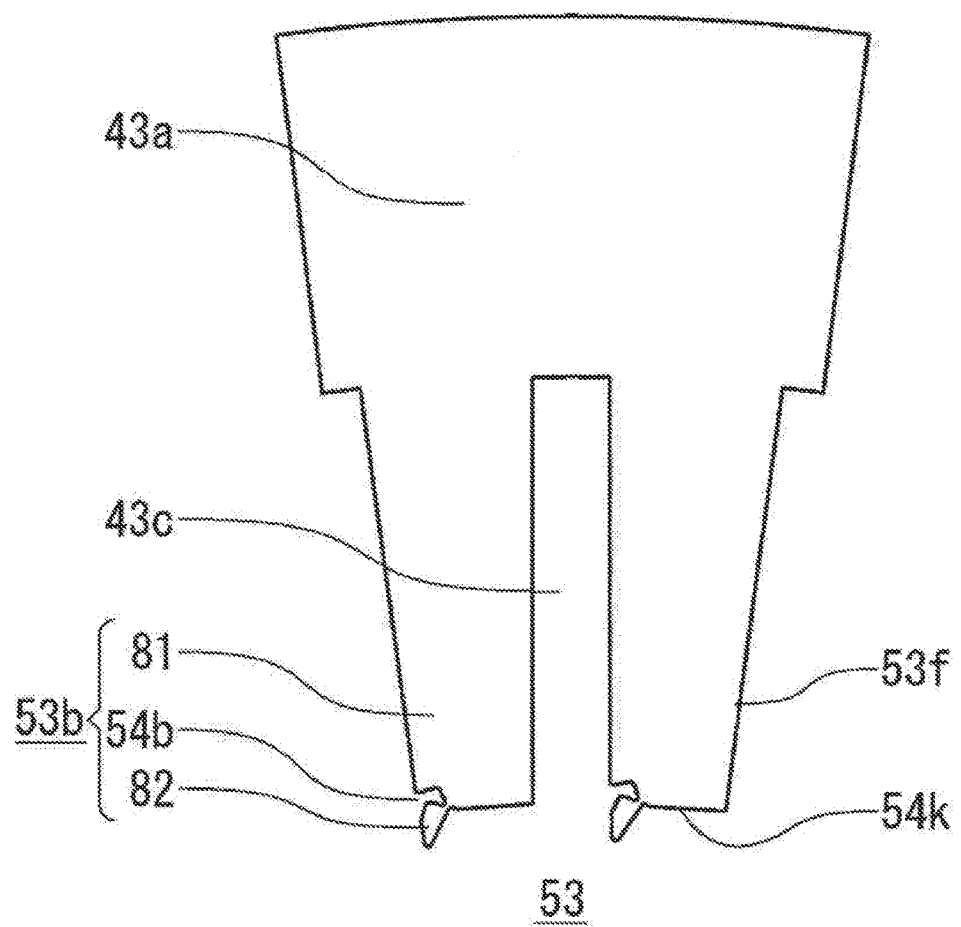
FIG. 17 is a schematic diagram of, viewed from the direction of an arrow C in FIG. 16, a first iron core block before the coil is mounted thereto according to embodiment 3 of the present invention.

FIG. 17 is a schematic diagram of, viewed from the direction of an arrow C in FIG. 16, the first iron core block before the coil is mounted thereto according to embodiment 3 of the present invention.

Figure 18:
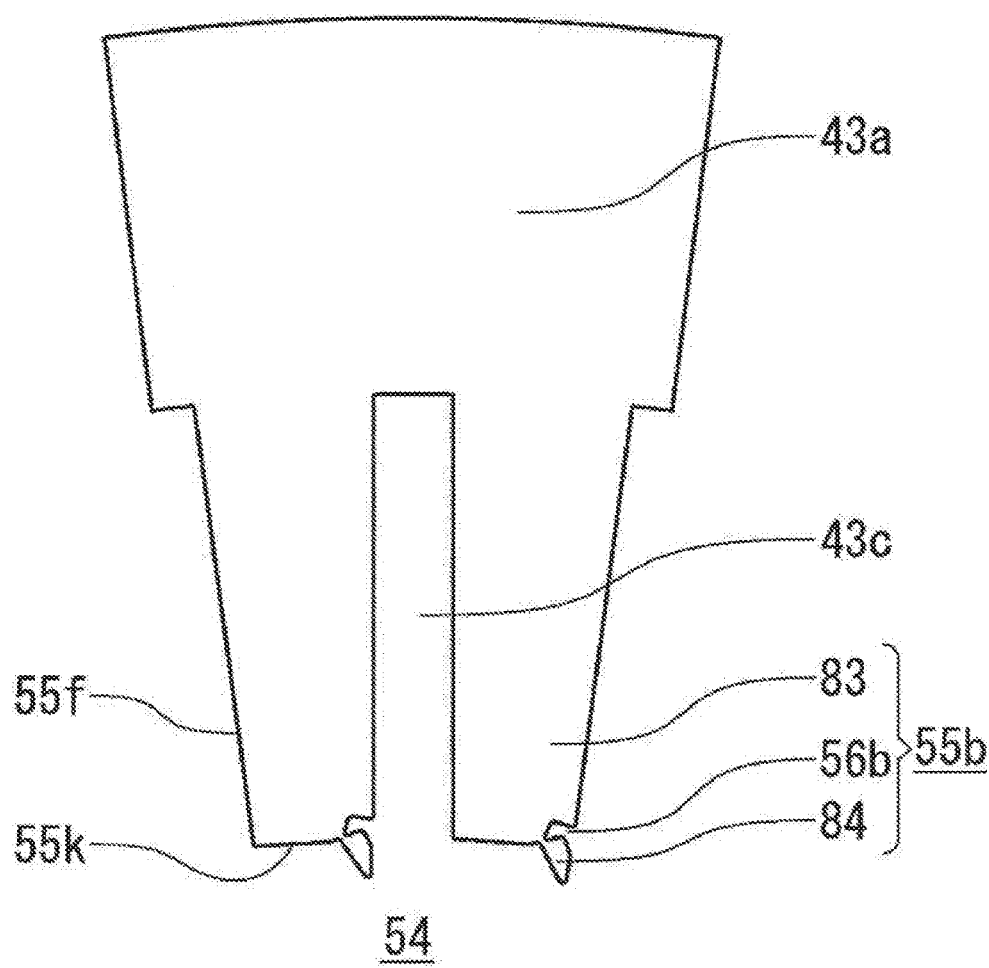
FIG. 18 is a schematic diagram of, viewed from the direction of the arrow C in FIG. 16, the second iron core block before the coil is mounted thereto according to embodiment 3 of the present invention.

FIG. 18 is a schematic diagram of, viewed from the direction of the arrow C in FIG. 16, the second iron core block before the coil is mounted thereto according to embodiment 3 of the present invention.

As shown in FIG. 17, in the first iron core block 53 before the coil is mounted thereto, the tooth 53b includes a tooth body portion 81 and a protrusion 82 at the tip side in the radial direction of the tooth 53b. However, the protrusion 82 is provided only to the edge at one side (left side on the drawing sheet of FIG. 17) in the circumferential direction of the tooth body portion 81.

At the border portion between the tooth body portion 81 and the protrusion 82, a tooth groove 54b which is a groove recessed to the inner side in the circumferential direction is provided.

The other side (right side on the drawing sheet of FIG. 17), at a tooth body portion lateral face 53f which is a lateral face at the outer side in the circumferential direction, of the tooth body portion 81 is directly connected to a tooth body portion tip-side end face 54k which is the end face at the tip side in the axial direction of the tooth body portion 81.

The end at the inner side in the radial direction of the slot 43c serves as a slot opening.

As shown in FIG. 18, also in the second iron core block 54 before the coil is mounted thereto, a tooth 55b includes a tooth body portion 83 and a protrusion 84 at the tip side in the radial direction of the tooth 55b. However, the protrusion 84 is provided only to the edge at the other side (right side on the drawing sheet of FIG. 18) in the circumferential direction of the tooth body portion 83.

At the border portion between the tooth body portion 83 and the protrusion 84, a groove (hereinafter, tooth groove) 56b recessed to the inner side in the circumferential direction is provided.

One side (left side on the drawing sheet of FIG. 18) at a tooth body portion lateral face 55f of the tooth 55b is directly connected to a tooth body portion tip-side end face 55k which is the end face at the tip side in the axial direction of the tooth body portion 83.

The end at the inner side in the radial direction of the slot 43c serves as a slot opening.

The shape of the tooth groove 54b of the first iron core block 53 and the shape of the tooth groove 56b of the second iron core block 54 in the present embodiment are the same as the shape of the tooth groove 24b in embodiment 1. Also, the shapes of the protrusion 82 and the protrusion 84 are the same as the shape of the protrusion 62 in embodiment 1.

Also in the present embodiment, after the coil is mounted to the stator iron core, the protrusion 82 and the protrusion 84 are bent as in embodiment 1.

Figure 19:
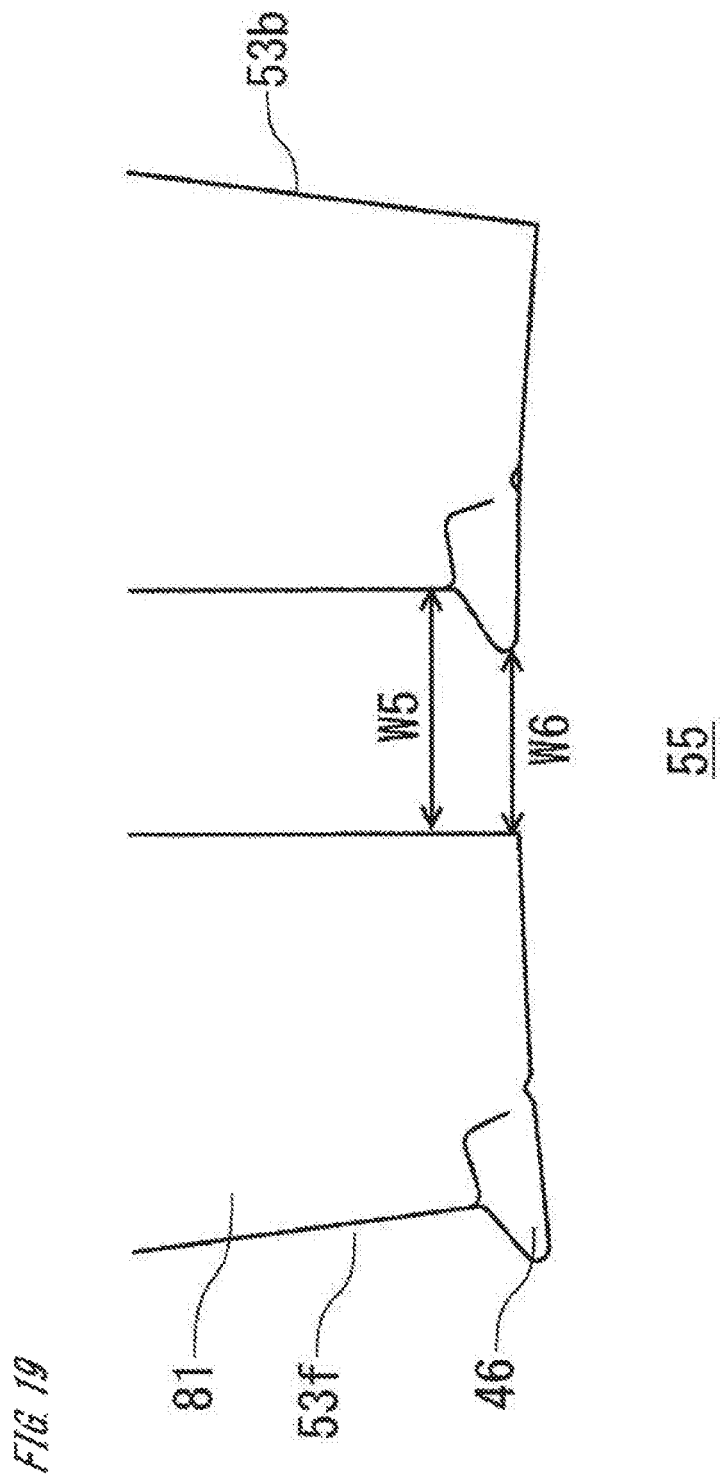
FIG. 19 is a schematic diagram showing the tip-side portion of the teeth of the first iron core block in which the shoes are formed, in the stator according to embodiment 3 of the present invention.

FIG. 19 is a schematic diagram showing the tip-side portion of the teeth of the first iron core block in which the shoes are formed, in the stator according to embodiment 3 of the present invention.

Similarly to embodiment 1, each protrusion 82 of the first iron core block 53 is rotated toward the outer side in the circumferential direction, whereby the tooth groove 54b is deformed. Then, as shown in FIG. 19, a shoe-formed first iron core block 55 is obtained in which a shoe 46 protrudes toward the outer side in the circumferential direction from one tooth body portion lateral face 53f.

In the shoe-formed first iron core block 55, a shoe interval W6 which is the interval in the circumferential direction between a shoe 46 and a tooth body portion lateral face 53f adjacent thereto is narrower than a slot opening width W5. That is, the slot opening is made narrow at one side (left side on the drawing sheet of FIG. 19) in the circumferential direction.

Figure 20:
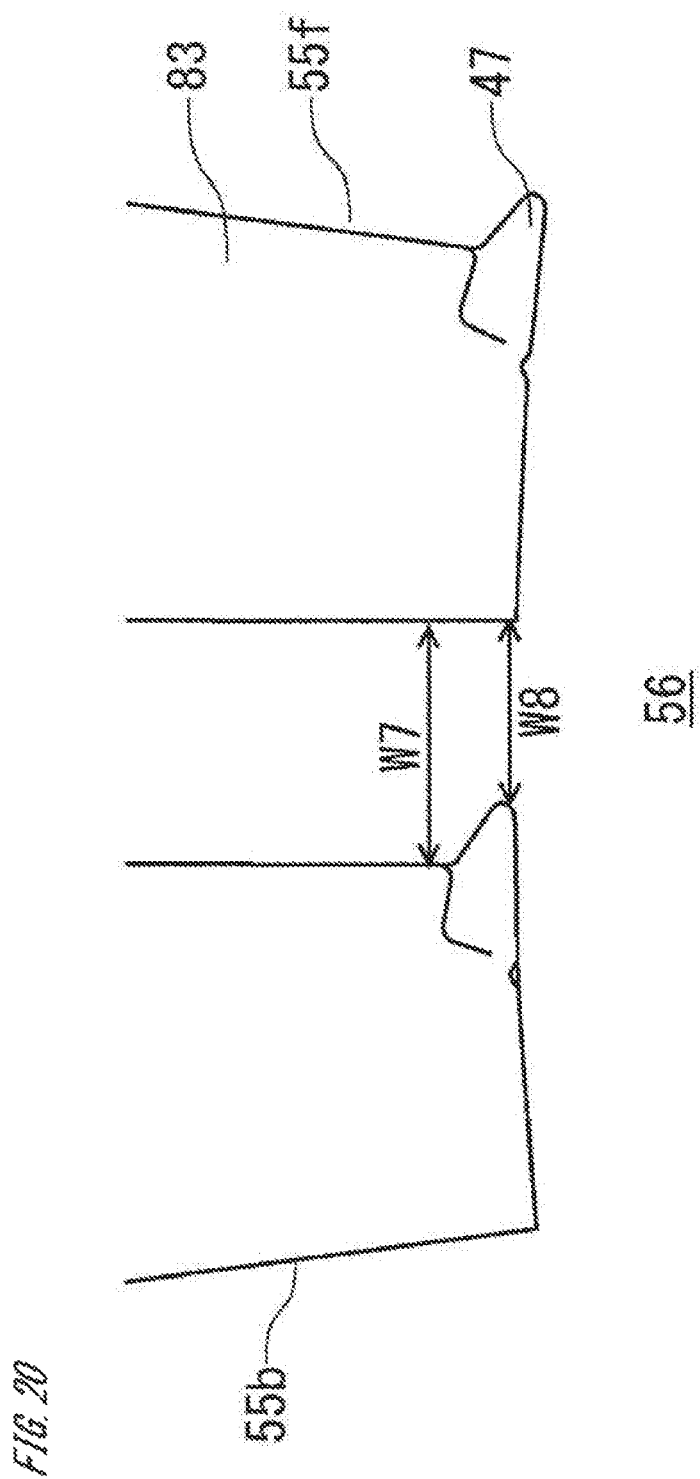
FIG. 20 is a schematic diagram showing the tip-side portion of the teeth of the second iron core block in which the shoe is formed, in the stator according to embodiment 3 of the present invention.

FIG. 20 is a schematic diagram showing the tip-side portion of the teeth of the second iron core block in which the shoes are formed, in the stator according to embodiment 3 of the present invention.

Similarly to embodiment 1, each protrusion 84 of a second iron core block 56 is rotated toward the outer side in the circumferential direction, whereby the tooth groove 56b is deformed. Then, as shown in FIG. 20, a shoe-formed second iron core block 56 is obtained in which a shoe 47 protrudes toward the outer side in the circumferential direction from the other tooth body portion lateral face 55f.

In the shoe-formed second iron core block 56, a shoe interval W8 which is the interval in the circumferential direction between a shoe 47 and a tooth body portion lateral face 55f adjacent thereto is narrower than a slot opening width W7. That is, the slot opening is made narrow at the other side (right side on the drawing sheet of FIG. 20) in the circumferential direction.

In the stator of the present embodiment, the first iron core block 53 and the second iron core block 54 forming the iron core block 43 have the structure as described above, and thus, the stator of the present embodiment has effects similar to those of the stator of embodiment 1.

Figure 21:
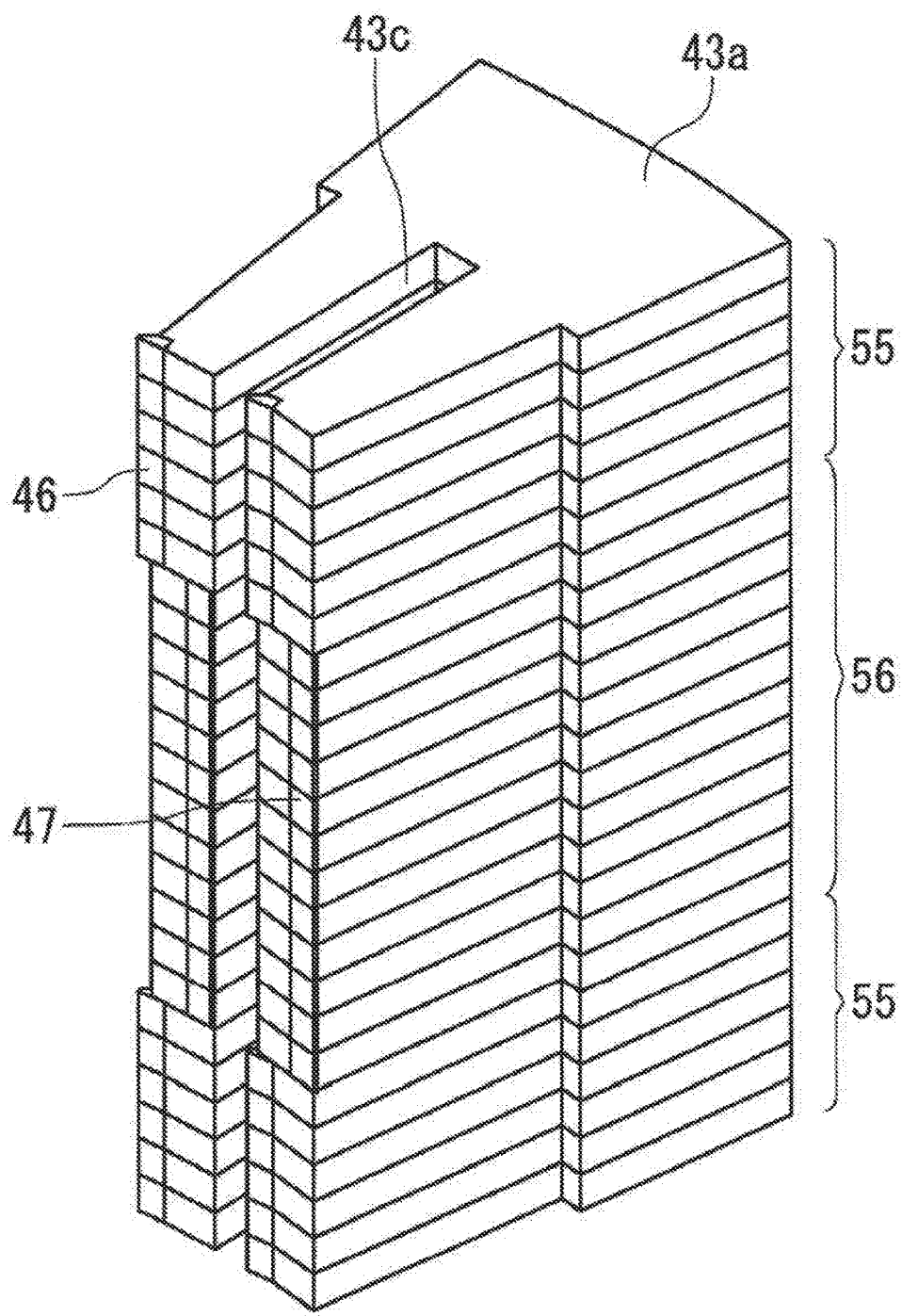
FIG. 21 is a schematic perspective view of the iron core block in which the shoes are formed, in the stator according to embodiment 3 of the present invention.

FIG. 21 is a schematic perspective view of the iron core block in which the shoes are formed, in the stator according to embodiment 3 of the present invention.

Figure 22:
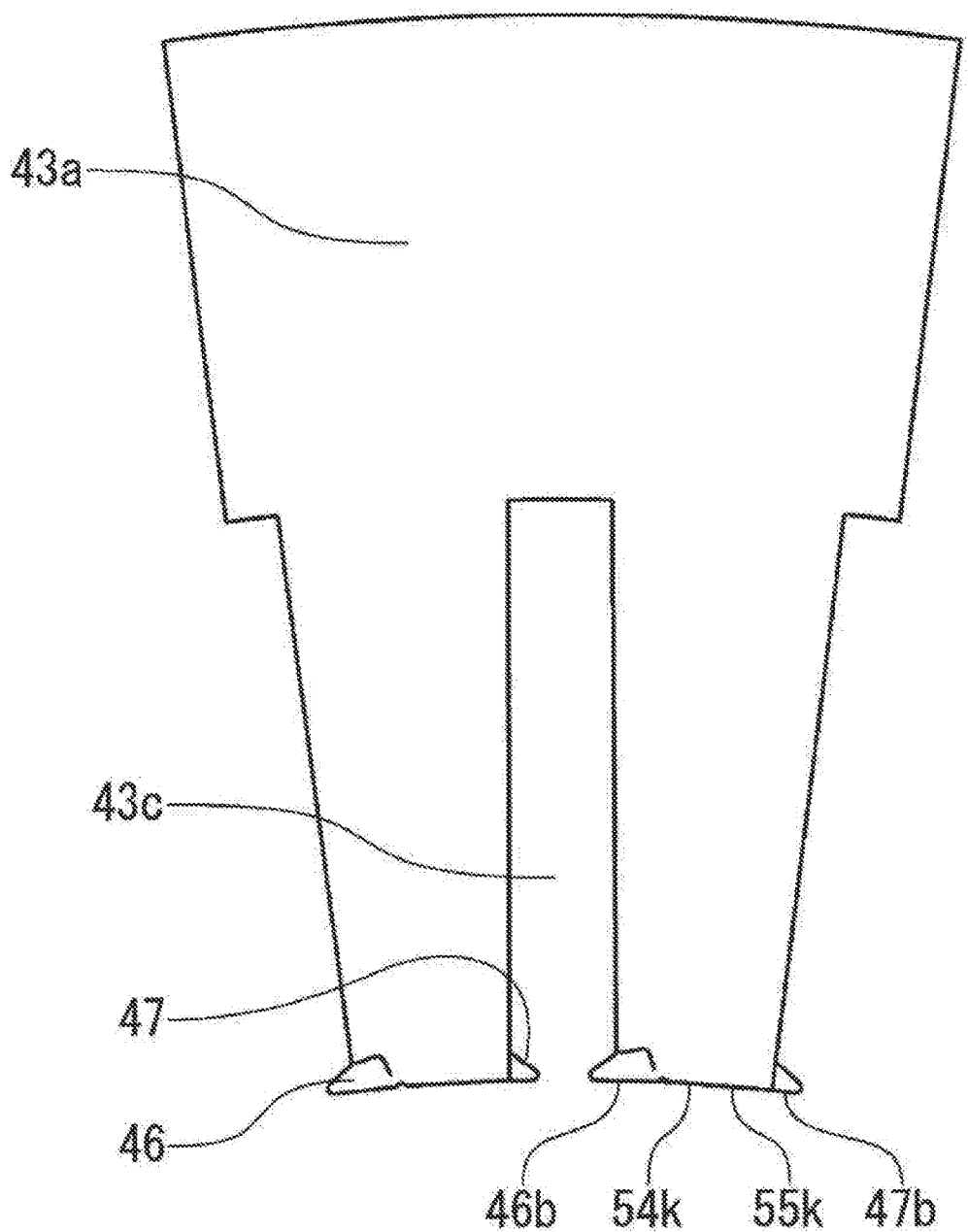
FIG. 22 is a front schematic diagram of the iron core block in which the shoes are formed, in the stator according to embodiment 3 of the present invention.

FIG. 22 is a front schematic diagram of the iron core block in which the shoes are formed, in the stator according to embodiment 3 of the present invention.

In FIG. 21 and FIG. 22, the coil 21 and the insulating paper 22 are not shown.

As shown in FIG. 21 and FIG. 22, in an iron core block (shoe-formed iron core block) 85 in which the shoes are formed according to the present embodiment, the shoe-formed first iron core blocks 55 in which the slot opening is narrowed at one side in the circumferential direction are disposed at both sides in the axial direction, and the shoe-formed second iron core block 56 in which the slot opening is narrowed at the other side in the circumferential direction is disposed at an intermediate portion in the axial direction. Accordingly, the stator iron core has a skew shape, and thus, a rotary electric machine that can reduce torque ripple and cogging torque can be realized.

As shown in FIG. 22, a rotor opposing face is formed by: a shoe-inner-side lateral face 46b of the shoe 46; a shoe-inner-side lateral face 47b of the shoe 47; the tooth body portion tip-side end face 54k of the shoe-formed first iron core block 55; and the tooth body portion tip-side end face 55k of the shoe-formed second iron core block 56.

In the shoe-formed iron core block 85 of the present embodiment, the shoe-formed first iron core blocks 55 are disposed at both sides in the axial direction, and the shoe-formed second iron core block 56 is disposed in an intermediate portion in the axial direction. However, not limited thereto, it is sufficient that the shoe-formed first iron core block 55 and the shoe-formed second iron core block 56 are disposed in the axial direction.

In the present embodiment, the protrusion 82 and the protrusion 84, and the tooth groove 54b and the tooth groove 56b are the same as the protrusion 62 and the tooth groove 24b in embodiment 1, but may be the same as the protrusion 72 and the tooth groove 34b in embodiment 2.

Embodiment 4

Figure 23:
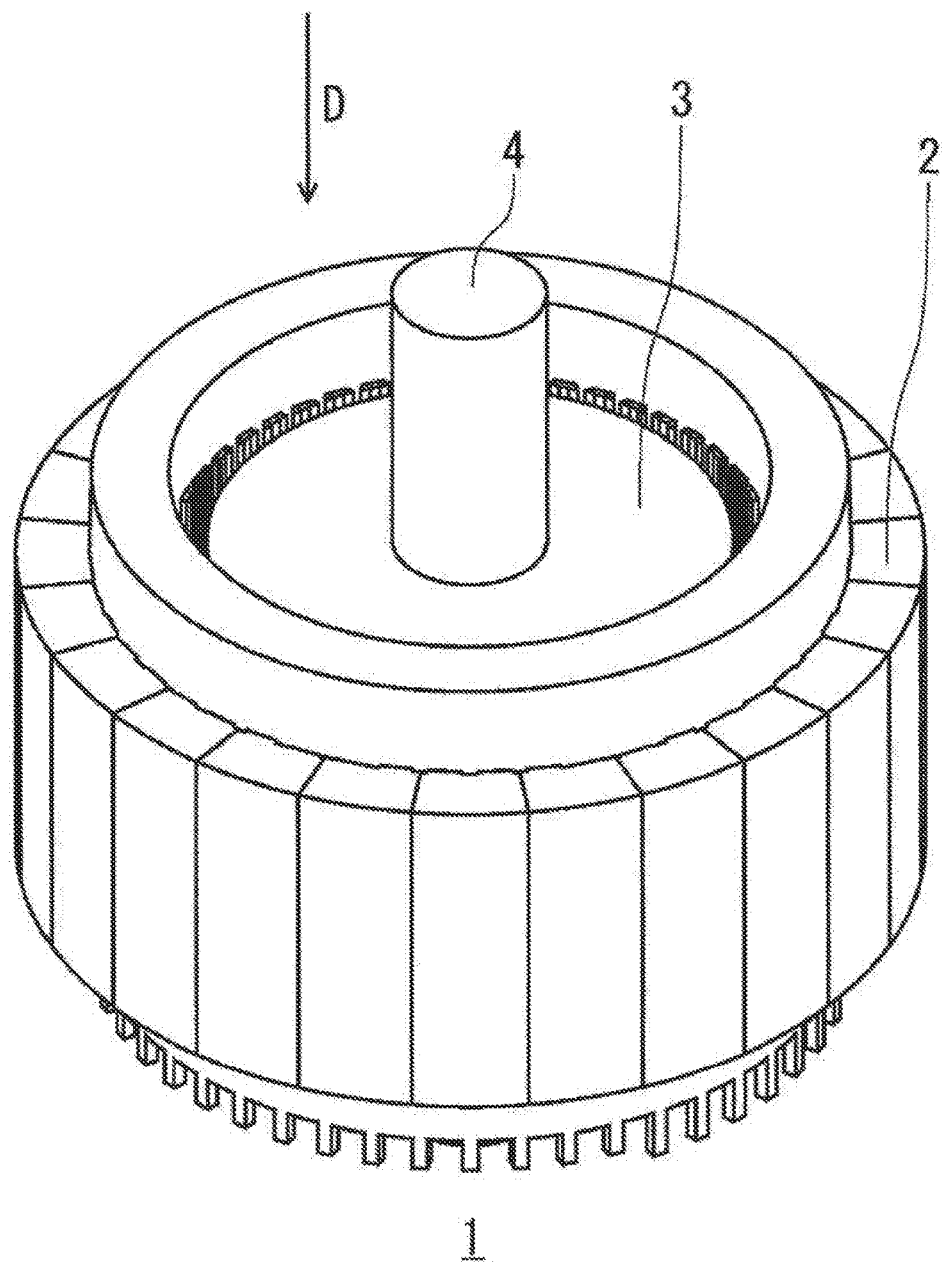
FIG. 23 is a schematic perspective view of a rotary electric machine according to embodiment 4 of the present invention.

FIG. 23 is a schematic perspective view of a rotary electric machine according to embodiment 4 of the present invention.

Figure 24:
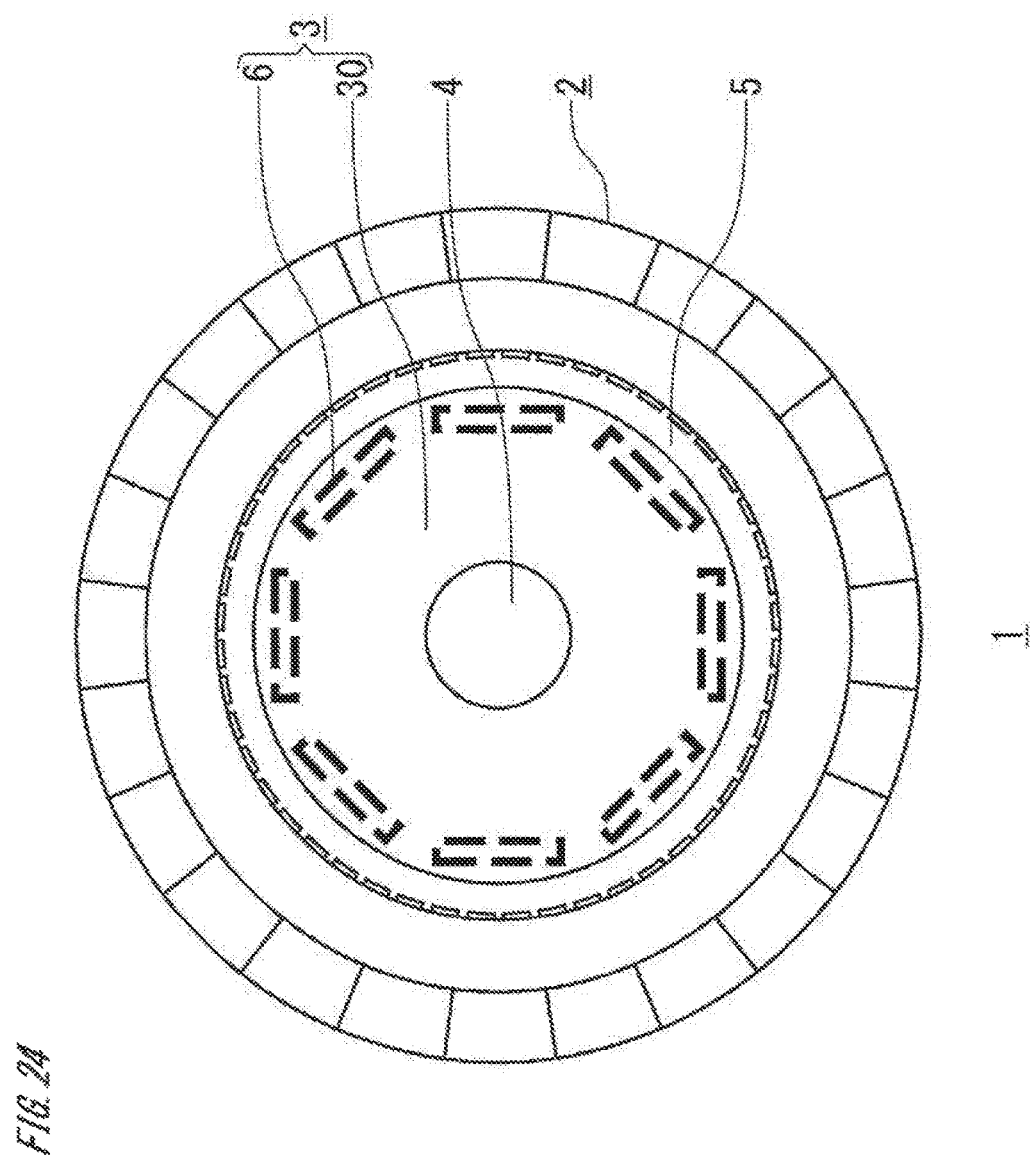
FIG. 24 is a front schematic diagram of the rotary electric machine shown in FIG. 23, viewed from the direction of an arrow D.

FIG. 24 is a front schematic diagram of the rotary electric machine shown in FIG. 23, viewed from the direction of an arrow D.

As shown in FIG. 23 and FIG. 24, a rotary electric machine 1 of the present embodiment includes: the stator 2 of embodiment 1 at the outer circumferential side; a rotor 3 provided to the inner circumferential side of the stator 2 and concentrically with the stator 2, with a predetermined air gap 5 from the inner circumferential face of the stator 2; and a shaft 4 passing through the axis position of the rotor 3 and holding the rotor 3. The dimension of the air gap 5 between the stator 2 and the rotor 3 is 0.1 to 2.5 mm, for example.

As shown in FIG. 24, the rotor 3 of the present embodiment includes: a rotor iron core 30 fixed to the shaft 4; and magnets 6 provided to the rotor iron core 30.

The rotor 3 of the present embodiment is a permanent-magnet-type rotor provided with magnets, but not limited thereto, the rotor may be a field-type rotor or a squirrel-cage-type rotor.

Although not shown, the shaft 4 is rotatably held by a frame or the like.

The rotor iron core 30 is formed by stacking rotor iron core pieces created by stamping an electromagnetic steel sheet, for example. However, the method of creating the rotor iron core piece is not limited to stamping of an electromagnetic steel sheet.

As the stator of the rotary electric machine according to the present embodiment, the stator 2 according to embodiment 1 is used. However, the stator according to embodiment 2 or the stator according to embodiment 3 may be used.

It is noted that, within the scope of the present invention, the above embodiments may be freely combined with each other, or each of the above embodiments may be modified or omitted as appropriate.

INDUSTRIAL APPLICABILITY

The method for manufacturing the stator, the method for manufacturing the rotary electric machine, and the iron core block according to the present invention can be used in industrial equipment that is required to have improved productivity and reduced cost.

The invention claimed is:

1. A method for manufacturing a stator including a stator iron core and a coil to be mounted to the stator iron core, wherein
an iron core block forming the stator iron core includes a back yoke portion and a tooth protruding in a radial direction from the back yoke portion,
in the iron core block before the coil is mounted thereto, the tooth includes a tooth body portion, and a protrusion provided at an edge in a circumferential direction at a tip in the radial direction of the tooth body portion, and a tooth groove is provided at a border portion between the tooth body portion and the protrusion, the tooth groove being a groove recessed to an inner side in the circumferential direction,
an angle between a tooth body portion lateral face which is a lateral face in the circumferential direction of the tooth body portion, and a tooth body portion stop portion which is a face, of the tooth groove, that is defined by the tooth body portion and is directly continued from the tooth body portion lateral face, is a right angle or an acute angle, and
in the protrusion, a protrusion-outer-side lateral face which is an outer-circumferential-side lateral face at a outermost side in the circumferential direction of the protrusion is at a position on an extension line from the tooth body portion lateral face or at a position to the inner side in the circumferential direction relative to the extension line,
the method comprising:
rotating toward the outer side in the circumferential direction the protrusion of the iron core block with the coil mounted thereto, to direct a tip of the protrusion toward the outer side in the circumferential direction, and to bring a protrusion stop portion into close contact with the tooth body portion stop portion, the protrusion stop portion being an outer-circumferential-side lateral face of the protrusion positioned between the protrusion-outer-side lateral face and the tooth groove, thereby forming a shoe in the tooth.

2. The method for manufacturing the stator according to claim 1, wherein
the tooth groove is formed by the tooth body portion stop portion, a tooth body portion abutment portion which is a face continued from the tooth body portion stop portion, and a protrusion abutment portion which is a face continued from the tooth body portion abutment portion,
the protrusion stop portion is a face continued from the protrusion abutment portion, and
the protrusion abutment portion is brought into close contact with the tooth body portion abutment portion by rotating toward the outer side in the circumferential direction the protrusion of the iron core block with the coil mounted thereto.

3. The method for manufacturing the stator according to claim 2, wherein
a relief portion is provided between the tooth body portion abutment portion and the protrusion abutment portion.

4. The method for manufacturing the stator according to claim 1, wherein
in the tooth body portion, a connection portion between the tooth body portion lateral face and the tooth body portion stop portion is a tooth body portion arc portion which is an arc face.

5. The method for manufacturing the stator according to claim 4, wherein
in the protrusion, a connection portion between the protrusion stop portion and the protrusion-outer-side lateral face is a protrusion arc portion which is an arc face, and a radius of the protrusion arc portion is greater than a radius of the tooth body portion arc portion.

6. The method for manufacturing the stator according to claim 1, wherein
the iron core block is composed of a first iron core block and a second iron core block stacked in the axial direction relative to the first iron core block,
in the first iron core block before the coil is mounted thereto, the protrusion is provided only to an edge at one side in the circumferential direction of the tooth body portion, and
in the second iron core block before the coil is mounted thereto, the protrusion is provided only to an edge at another side in the circumferential direction of the tooth body portion.

7. A method for manufacturing a rotary electric machine comprising
disposing a rotor concentrically with the stator, wherein
the stator is manufactured by the method for manufacturing the stator according to claim 1.

8. An iron core block comprising:
a back yoke portion and a tooth protruding in a radial direction from the back yoke portion, wherein
in the iron core block, the tooth includes a tooth body portion, and a protrusion provided at an edge in a circumferential direction at a tip in the radial direction of the tooth body portion, and a tooth groove is provided at a border portion between the tooth body portion and the protrusion, the tooth groove being a groove recessed to an inner side in the circumferential direction,
an angle between a tooth body portion lateral face which is a lateral face in the circumferential direction of the tooth body portion, and a tooth body portion stop portion which is a face, of the tooth groove, that is defined by the tooth body portion and is directly continued from the tooth body portion lateral face, is a right angle or an acute angle, and
in the protrusion, a protrusion-outer-side lateral face which is an outer-circumferential-side lateral face at a outermost side in the circumferential direction of the protrusion is at a position on an extension line from the tooth body portion lateral face or at a position to the inner side in the circumferential direction relative to the extension line.

9. The iron core block according to claim 8, wherein
the tooth groove is formed by the tooth body portion stop portion, a tooth body portion abutment portion which is a face continued from the tooth body portion stop portion, a protrusion abutment portion which is a face continued from the tooth body portion abutment portion, and a protrusion stop portion which is a face continued from the protrusion abutment portion.

10. The iron core block according to claim 9, wherein
a relief portion is provided between the tooth body portion abutment portion and the protrusion abutment portion.

11. The iron core block according to claim 9, wherein
in the tooth body portion, a connection portion between the tooth body portion lateral face and the tooth body portion stop portion is a tooth body portion arc portion which is an arc face.

12. The iron core block according to claim 11, wherein
in the protrusion, a connection portion between the protrusion stop portion and the protrusion-outer-side lateral face is a protrusion arc portion which is an arc face, and a radius of the protrusion arc portion is greater than a radius of the tooth body portion arc portion.

13. The iron core block according to claim 8, wherein
the iron core block is composed of a first iron core block and a second iron core block which is stacked in the axial direction relative to the first iron core block,
in the first iron core block, the protrusion is provided only to an edge at one side in the circumferential direction of the tooth body portion, and
in the second iron core block, the protrusion is provided only to an edge at another side in the circumferential direction of the tooth body portion.

\* \* \* \* \*